Sept. 28, 1965 R. REEBER ETAL 3,208,414
PROGRAM-CONTROLLED AUTOMATIC SEWING APPARATUS
Filed Dec. 3, 1962 15 Sheets-Sheet 4

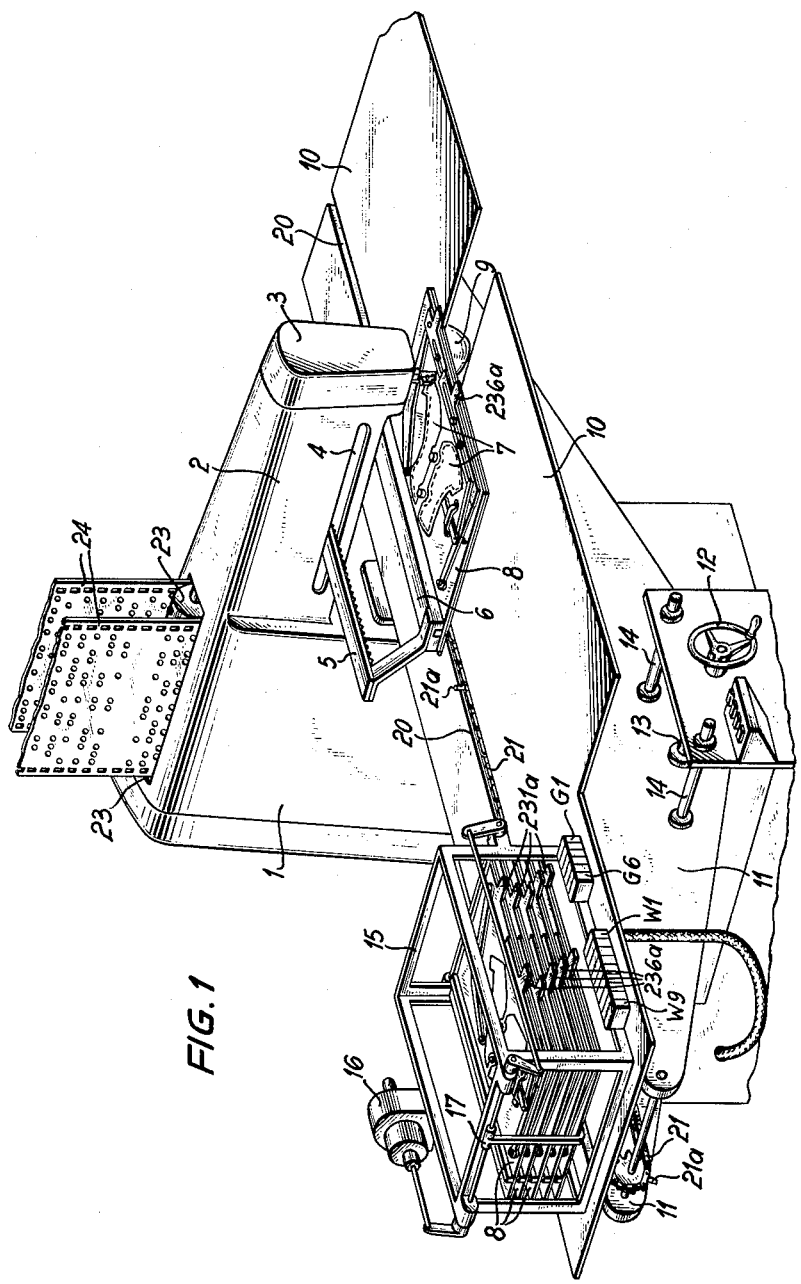

INVENTORS
RUDOLF REEBER
HANS ADAM &
HANS ORTH
BY
ATTORNEY

INVENTORS
RUDOLF REEBER
HANS ADAM &
HANS ORTH
BY
ATTORNEY

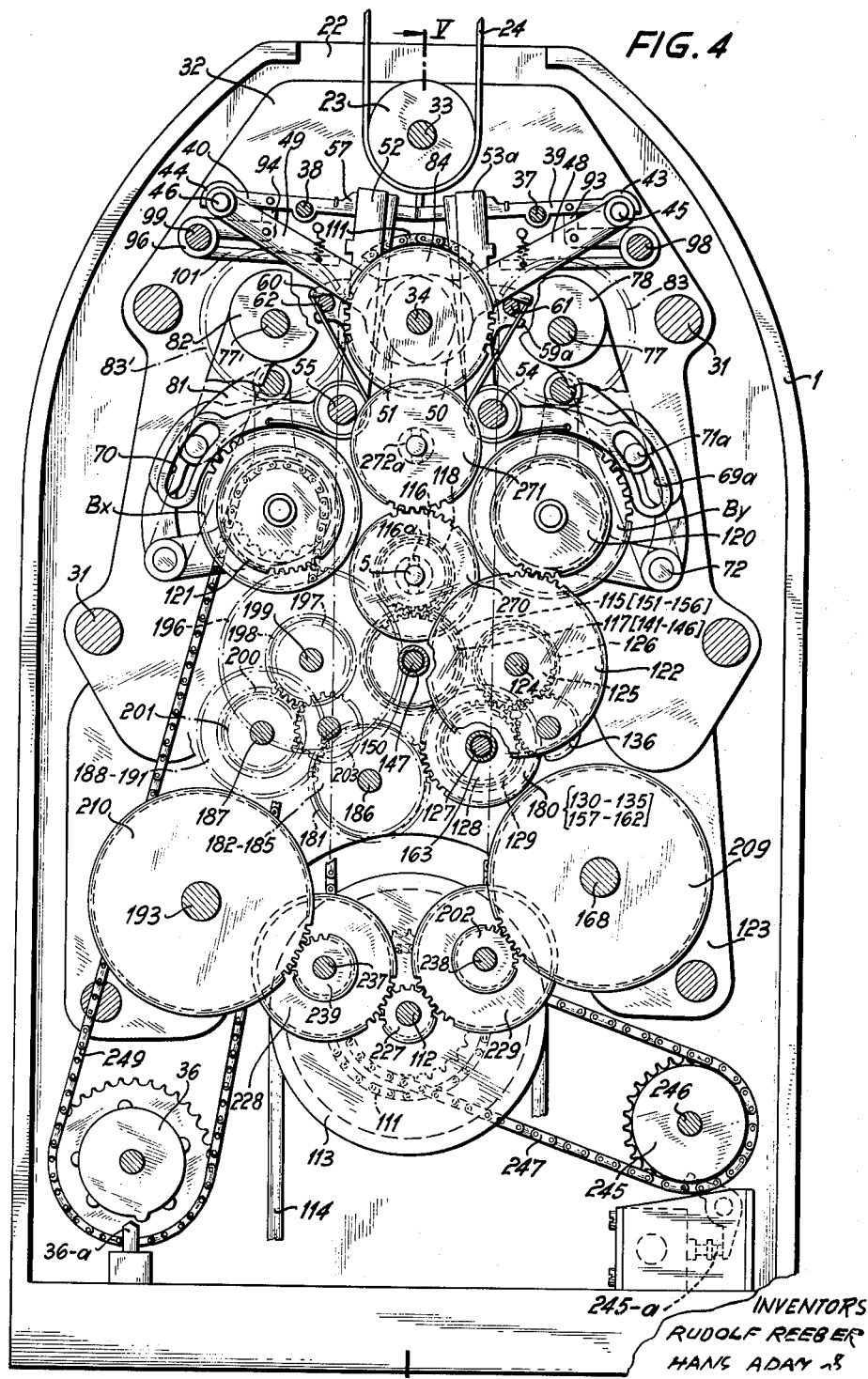

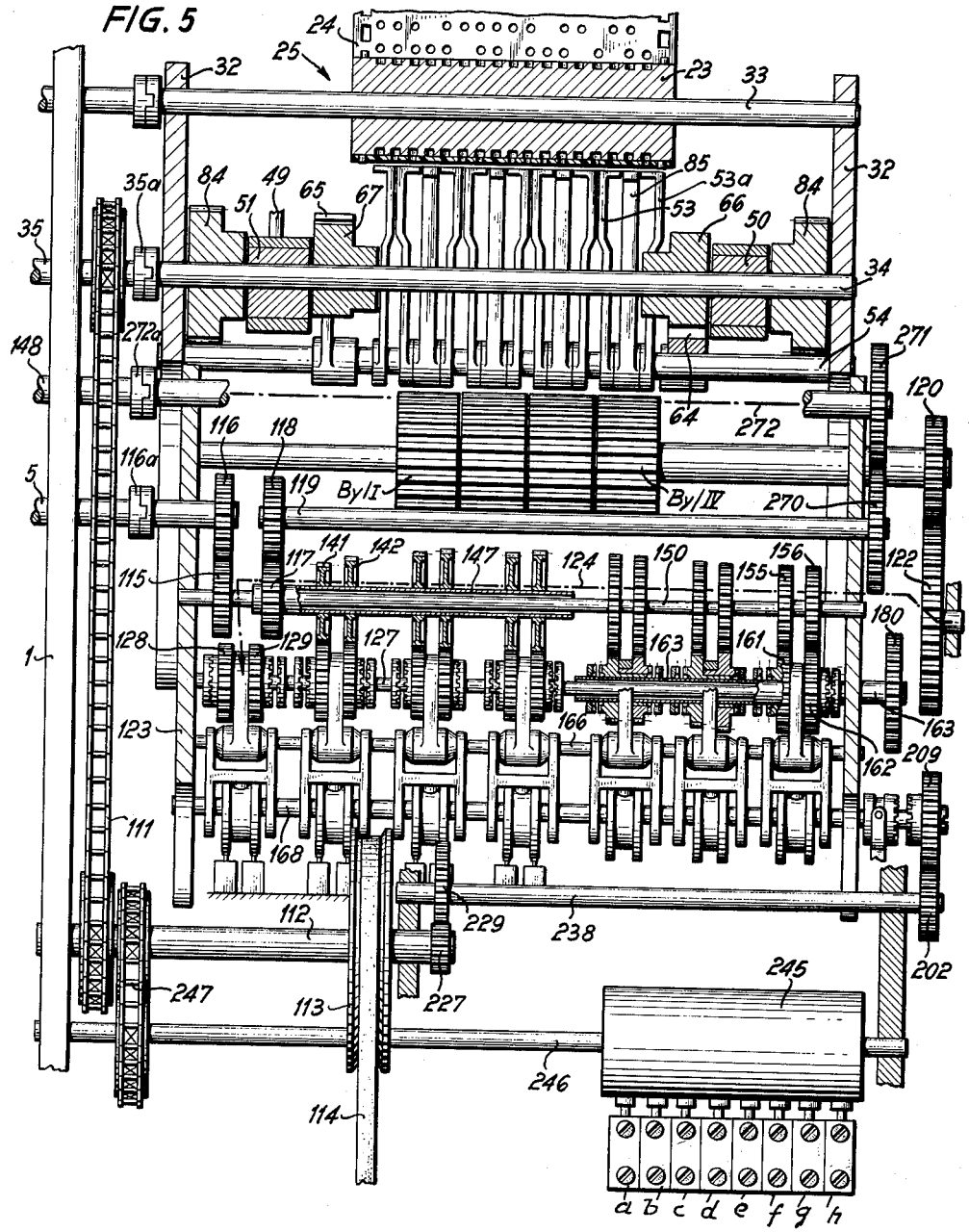

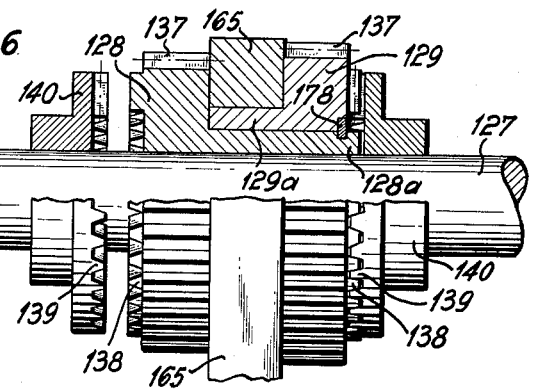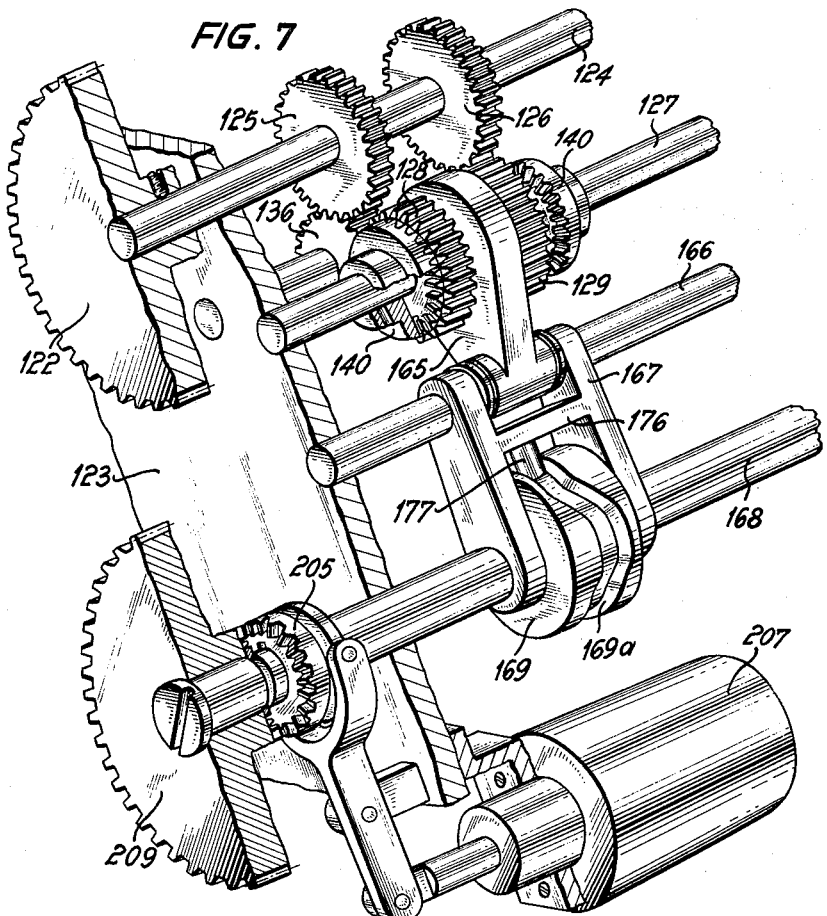

INVENTORS
RUDOLF REEBER
HANS ADAM
HANS ORTH

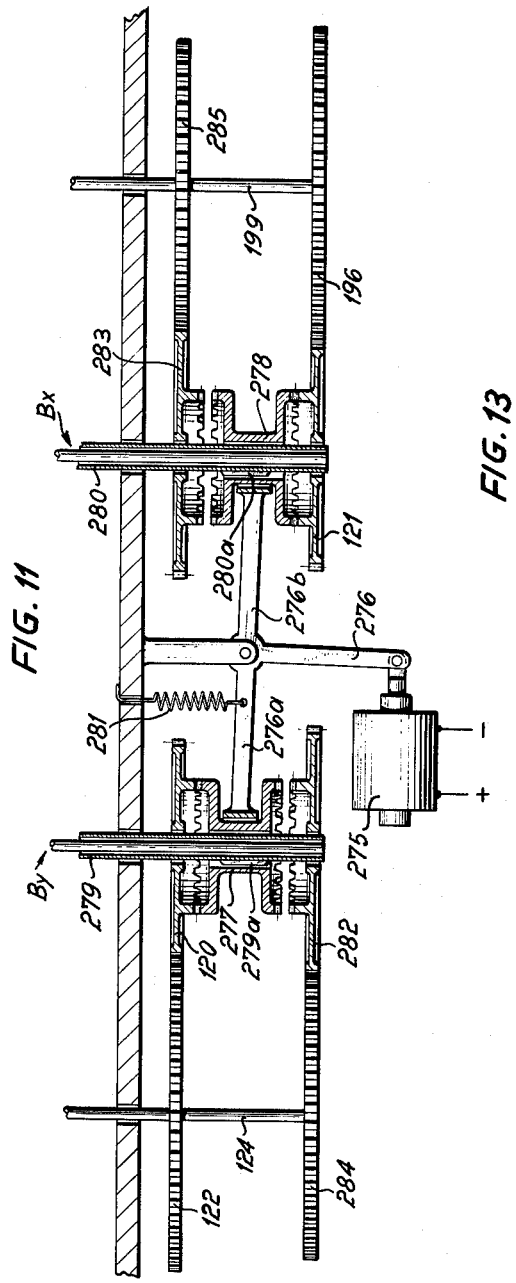
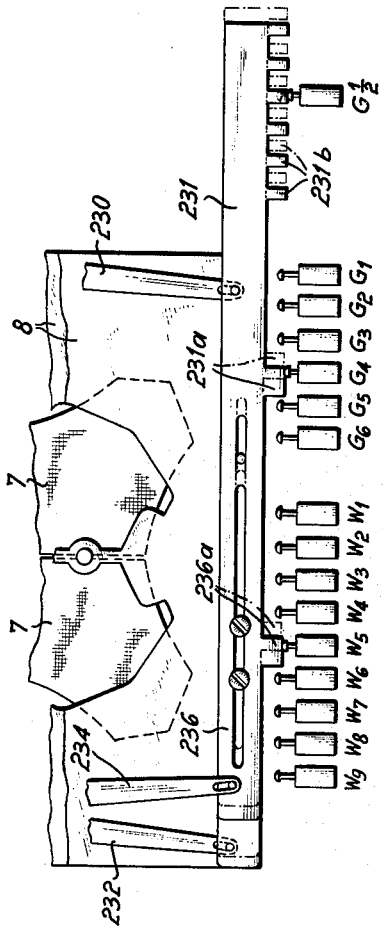

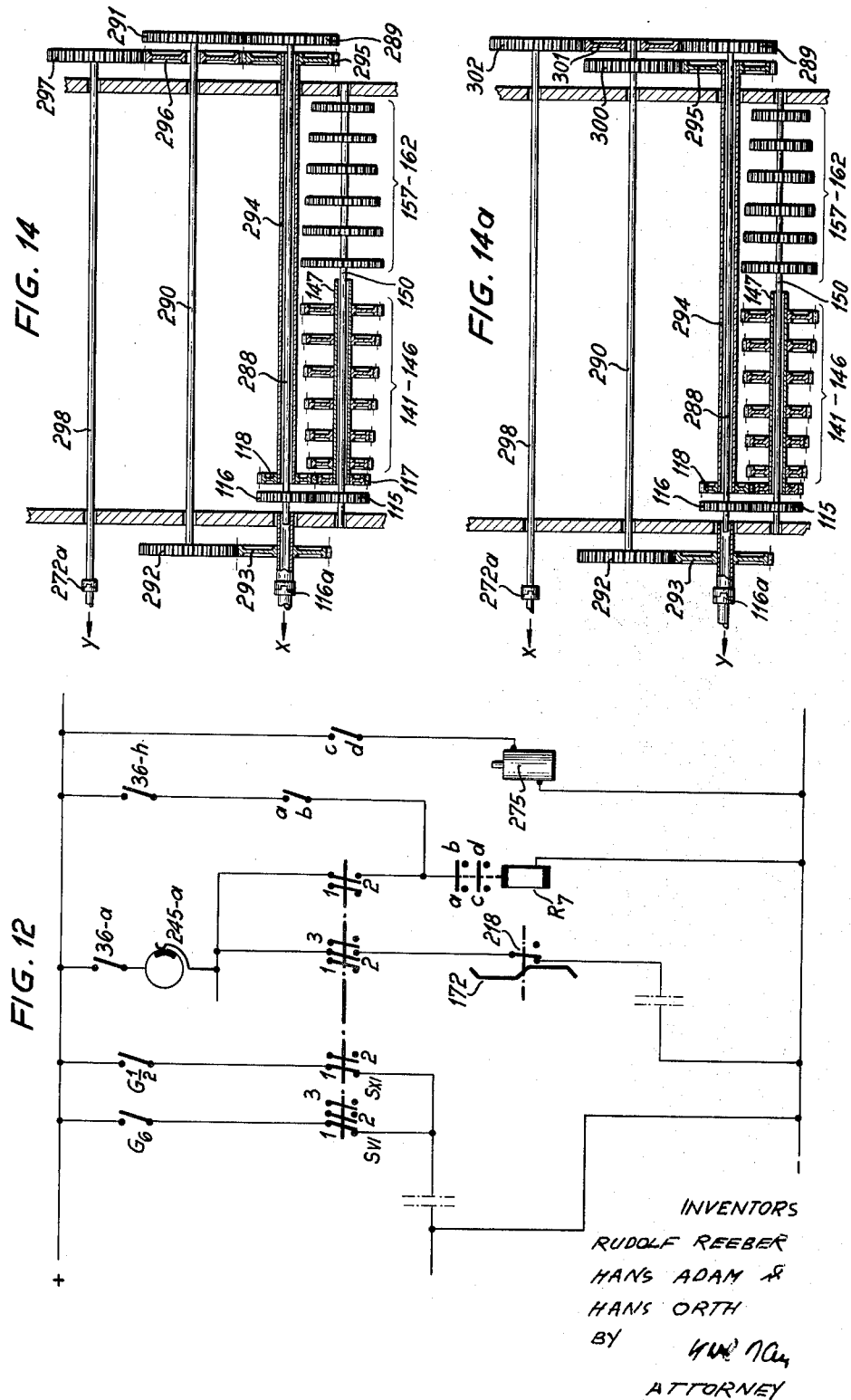

Sept. 28, 1965   R. REEBER ETAL   3,208,414
PROGRAM-CONTROLLED AUTOMATIC SEWING APPARATUS
Filed Dec. 3, 1962   15 Sheets-Sheet 14

INVENTORS
RUDOLF REEBER
HANS ADAM
HANS ORTH
BY
ATTORNEY

# United States Patent Office 3,208,414
Patented Sept. 28, 1965

3,208,414
PROGRAM-CONTROLLED AUTOMATIC SEWING APPARATUS
Rudolf Reeber and Hans Adam, Kaiserslautern, Pfalz, and Hans Orth, Alsenborn, Pfalz, Germany, assignors to G. M. Pfaff A.G., Kaiserslautern, Pfalz, Germany, a corporation of Germany
Filed Dec. 3, 1962, Ser. No. 243,188
14 Claims. (Cl. 112—2)

The present invention relates to program-governed sewing apparatus of the general type comprising a pair of perforated tape-controlled multiple-set planetary gear adders for the automatic displacement of a sewing goods carrier in the $x$ and $y$-coordinate directions, to produce a sewing pattern of predetermined size and configuration.

Automatic sewing apparatus of this type has heretofore become known for use in connection with embroidering machines, as shown for instance by German Patent No. 429,395, issued May 26, 1926, said machine comprising punched card or perforated tape-controlled feed mechanism for the operation of a transport slide or carrier supporting the sewing goods to be operated on. Such feed mechanism ordinarily comprises a pair of coordinate gear units constructed in the form of binary or ternary planetary gear adders each, in turn, comprising a number of serially connected planetary gear sets. By the term "binary" or "ternary" adder there is understood a gear assembly comprising a plurality of serially connected planetary gear sets designed such that the output displacement or rotation of each set is equal to ½ or ⅓, respectively, of the displacement by the preceding gear set of the assembly. In other words, the successive reductions by the individual sets upon driving of a single set, are related like the members of a geometric series, that is, by ratios 1:2:4:8 . . . in the case of a binary adder, and 1:3:9:27 . . . in the case of a ternary adder, respectively.

The known automatic control devices of this type are principally suitable for the sewing of only a single stitching pattern the exact configuration or contour of which is defined by or stored in the perforated control tape. A main disadvantage of such devices is the fact that even a slight change in the basic stitching pattern will require the exchange of the perforated tape, thus rendering it practically impossible to carry out a fully automatic control of similarly shaped yet differently sized sewing pieces without interruption of the operation of the machine and without the requirement of an additional operator to change the tape, to re-adjust the transport slide and to effect other changeover adjustments necessary in the operation of the machine.

Accordingly, an important object of the present invention is the provision of improved program-controlled automatic sewing apparatus of the general type referred to by which a sewing program or pattern stored by a perforated tape may be varied selectively and fully automatically within limits in either the $x$ or $y$-direction or both in dependence upon the size of a plurality of non-sorted work pieces to be operated on, substantially without requiring an exchange of the perforated tape or equivalent storage device or interfering with the normal operation of the automatic sewing controls.

With the foregoing primary object of the invention in view, the latter involves generally the structural and functional integration or combination of a known planetary gear adding and drive mechanism, preferably of the ternary gear type, being controlled by a perforated tape or the like storage device, with a variable coordinate distorting gear mechanism adapted to be adjusted or shifted, preferably fully automatically, in dependence upon the factors of variation of the sewing pieces to be operated on such as size and width, respectively.

According to a preferred embodiment of the invention, the coordinate distorting mechanism controlling the maximum excursion in either or both of the $x$ and $y$-coordinate directions, for the sewing of similar patterns of different size, may consist of a variable coupling gear box or unit, whereby each coordinate feed unit serves to drive a shaft fitted with a multiplicity of pairs of coordinated coupling halves with each said pairs of coupling halves cooperating with pairs of selectively adjustable coupling gears of different size for the control of the maximum coordinate excursions of the sewing goods slide or carrier, in a manner as will become further apparent as the following description proceeds.

In control mechanism of this type the problem arises as to how to impart the variation factors (size, width) of a sewing work piece to be operated on to the coordinate distortion mechanism, in such a manner as to cause the desired distortion or limit excursions in the $x$ and/or $y$-coordinate directions of the basic pattern or program being stored upon the perforated tape by selection and shifting of the proper coupling gear to modify the $x$ and $y$-displacements of the sewing goods carrier in dependence upon the size of the sewing pieces.

The latter object, according to a further feature of the invention, is achieved by the provision of a plurality of simultaneously rotating control or cam disks each being coordinated with one of the couping gears of the distorting mechanism, said disks being angularly displaced relative to each other and designed to cause a sequential coupling and decoupling of said gears with a drive shaft of the sewing goods carrier, each of the coordinate sets of said control disks having, in turn, coordinated therewith an electromagnet for the coupling of the shaft supporting the disks with a continuously rotating driving gear, and further means being provided for the interruption of the circuit of said electromagnet in dependence upon the variations of the sewing pieces, to thereby effect a permanent selection of the appropriate coupling gear by the stoppage of said shaft and setting of the required distortion or maximum coordinate displacements.

The carrying into effect of this concept of the invention involves the further requirement of providing an electric control system by means of which the coupling magnet is interrupted at the instant when the desired coupling gear has been operated into meshing engagement with the output shaft of the feed mechanism by its coordinated control disk.

The last-mentioned object of the invention is achieved, in accordance with a preferred embodiment, by the provision of an interrupting or keying switch coordinated with or being operated by each of said control disks, said switch being inserted in both the circuit of the associated coupling magnet and one of a plurality of release switches operated in dependence upon the variation factors of the sewing pieces to be operated on, said interrupting switches being, in turn, actuated by control means associated with said disks to open the circuit of said coupling magnet at a predetermined position of the disks coinciding with the coupling of a desired coordinate distorting gear with the drive of the sewing goods carrier or transport slide thereof.

In many cases, it is desirable to effect not only a single change of the mean contour of the seam defined by the perforated tape, but to additionally vary an already distorted coordinate, corresponding to a first variation factor, in accordance with a secondary variation factor being dependent upon said first factor. Such a condition prevails, for instance, in the manufacture of shoes where the size is determined by a given length and a coordinated basic width to each of which latter are, in turn, coordinated a number, normally four, of variable or actual widths, or which it is desirable to superimpose upon the basic width at will. For the design of automatic apparatus complying with the foregoing requirements, feed mechanism as described in the following is required.

Let it be assumed, for purposes of the following discussion, that the feed unit controlling the displacement in the y-coordinate determines the length of the stitching pattern and, to this end, drives a shaft carrying the aforementioned coupling gears cooperating with countergears fixedly mounted upon a further shaft which serves to drive the transport slide or sewing goods carrier in its lengthwise direction, and that furthermore the feed unit controlling the displacement in the x-coordinate drives a shaft fitted with coupling gears designed for distorting the width of the pattern and cooperating with countergears mounted upon an intermediate shaft driving a third shaft fitted with coupling gears for the distortion of the basic width, with the countergears of the last-mentioned coupling gears being mounted upon the final shaft driving the transport slide in the transverse or x-direction. A basic requirement in such a case is the simultaneous stoppage of the supporting shafts of the control disks for both the length and basic width, inasmuch as the latter is dependent upon or a function of the former.

Yet a further object of the invention is the provision of control mechanism of the type referred to characterized by a most favorable and compact constructional embodiment involving a minimum of mounting space for the numerous parts, in particular, gear trains required.

The latter object is achieved, according to another feature of the invention, by the provision of an arrangement, whereby the coupling gear sets for effecting a second variation, for instance the distortion of the basic width, being driven by the countergear set of the coupling gears for effecting a first variation, for instance the distortion of the actual width, is mounted upon a hollow shaft being coaxial with the shaft carrying the coupling gear set for effecting a third variation, for instance the distortion of the length, and whereby furthermore the countergear set of the latter coupling gear set is, in turn, supported by a hollow shaft being coaxial with the shaft carrying the countergear set of the coupling gears for effecting said second variation, in the manner shown by the drawings and described in further detail hereafter.

A further essential feature of the automatic feeding apparatus according to the invention consists in the reversibility of the coordinate directions, this being of special importance in the case of automatic sewing machines designed for the production of shoe parts, as briefly set forth in the following and as will become further apparent from the description of the drawings.

It is customary in practice to mount pairs of corresponding shoe parts upon a sewing goods carrier or frame and to feed the same to the automatic sewing machine. Inasmuch as the perforated tape stores the pattern of one part only and is constructed as a finite unit, it is necessary to reverse the coordinate direction for the sewing of a mirror image pattern upon the second part after completion of the sewing of said first part.

For the latter purpose, there is provided, according to the invention, between each of the outputs of the x and y-coordinaate feed units and each of the respective input shafts of the distortion mechanisms a conventional reversing gear box or unit comprising a first pair of directly meshing gears and a second pair of gears connected through an intermediate or reversing gear.

Still, a further object of the invention is, therefore, the provision of control means for the afore-mentioned reversing gear units designed to enable a reversal of both coordinate directions and for each of the possible coordinate distortion adjustments or controls.

The last-mentioned object, according to a further feature of the invention, is achieved by the provision for each coordinate distortion stage of an auxiliary control or cam disk controlling the coordinated reversing gears in such a manner that the latter control disks in each of the switching positions of the previously mentioned main control disks of the coordinate distorting mechanism have a pair of switching positions for rotation in the right or left directions, respectively, in conjunction with additional control means to effect the disconnection of the associated coupling magnet, and, in turn, of the shaft carrying the auxiliary control disks, respectively.

Considered from a practical standpoint, the last-mentioned concept or aspect of the invention involves the combination of control or operating means set forth in greater detail and by way of example in the following.

Let it be assumed, for this discussion, that there are provided six selectable pairs of changing gear sets for effecting the length distortion and forming a first distortion stage, and that, furthermore, to each pair of changing gears there is coordinated a control disk which latter accordingly has two control positions. From this it follows that such a distortion stage will require three control disks being mounted upon a common shaft and being angularly displaced by 120° relative to each other in order, to select a reversing gear pair during each partial revolution of said disks of 60°. At the same time, it is necessary to cause each selected changing gear pair to rotate in either right or left direction, the latter effect being obtained, as pointed out, by the control of the reversing gear trains by a control curve of the associated auxiliary control disks having twelve operating points or sections, that is, six points for the rotation in the left direction and six points for the rotation in the right direction. In other words, two control points of the control curve for the reversing gear units are coordinated with each control point of the control curves of the changing gear units for effecting the coordinate distortions in both size and direction.

Inasmuch as the size is dependent upon the sewing pieces to be operated on, whereas the coordinate direction depends on whether the first or second part of a pattern is being sewn, and since, furthermore, the operation of the coupling gears is possible only within predetermined points of the effective operating area of the transport slide or frame, there results the further requirement of control of the sewing operation in proper coordination with the recorded program stored upon the perforated tape or equivalent programming device.

According to a still further aspect of the invention, the last-mentioned object is achieved by the automatic control of all the steps during an operating program or cycle by means of a sequence control drum or the like switching device provided with control lines and being, in turn, operated by data or auxiliary perforations stored upon the control tape carrying the main data for the sewing or stitching control.

In order to reduce the idling times of the machine to a minimum, it is necessary, upon completion of each sewing pattern or cycle, that is, upon finishing a sewing part, to return the transport slide to its predetermined starting position. This aim can be achieved readily with sewing patterns or seams being closed upon themselves or, where the patterns consist of an open seam, by so mounting the parts upon the sewing goods carrier that the combination of the pattern of the left part with the pattern of the right part results in a closed feeding path of the transport slide or frame. On the other hand, if the sewing patterns consist of two open and parallel seams of each part, it is not always possible to so mount both parts as to obtain a closed feeding path of the slide, due to the fact, as in the case of shoe manufacture, that the increase n the y-coordinate, that is, of the length, may differ from the increase in the x-coordinate, that is, of the basic width, respectively.

Accordingly, yet another object of the invention is the provision of means to enable an interchange of the coordinates by exchange of the gear pairs transmitting the distorted coordinate feeding values.

The operating scope of the automatic control mechanism may be enlarged substantially by relatively simple means to enable an increase of the number of sizes of the sewing pieces to be handled by the machine, by the interposition of additional auxiliary changing gear trains between the output of the coordinate feed units and the inputs of the following distortion stages, such as, for instance, in order to double the number of sizes, or to enable the sewing of "half" sizes by means of the same control mechanism.

The hitherto known feed mechanisms being based, as pointed out, on the addition principle of a planetary gear set have not been found fully satisfactory to comply with all the practical requirements encountered in automatic sewing operations of the type forming the basis of the present invention. These requirements are primarily (1) a compact design of the gear mechanisms to enable their ready structural incorporation within the housing of a conventional sewing machine, (2) an accurate control of the planetary gear sets to ensure an exact transfer of the operating (displacement) values stored by the perforated tape, (3) a minimum of interference and absolute assurance to prevent random displacement of the gears other than in accordance with the data stored upon the perforated tape, or free from faulty perforation, respectively, and (4) a minimum load upon the tape during the scanning operation, to reduce the tape thickness and, in turn, to result in the advantage of a small bending radius, small width and reduced length of the tape, as well as other desirable tape characteristics.

Referring to requirement (1), compact design necessitates a short transmission path between the tape and the associated planetary gear sets driven thereby. This requirement could be fulfilled by causing each of the two actuating levers of a single gear set to resiliently engage the excentric-driven scanning lever and to impart the drive to the respective gear sets in proportion to the displacement of said scanning lever. Such an arrangement has the disadvantage that the spring providing the resilient force must have a considerable strength, whereby to deleteriously affect the load on the tape in contrast to requirement (4).

Accordingly, a further object of the invention is the elimination of the foregoing defects and disadvantages by the suitable subdivision of the rows of perforations upon both coordinates and by the provision on each side of the perforated tape of a set of scanning levers each provided with a stop or abutment and serving to reproduce the program in amplified fashion by the varying position of said stops projecting into or being retracted from the paths of the cooperatng actuating levers driving the co-ordinated planetary gear units.

Referring to requirement (4) relative to faulty perforation of the control tape, the following must be considered. There are provided two rows of perforations for each planetary gear set of a coordinate feed unit, one for left and one for right rotation, with the preferred operation being as follows: perforation representing stoppage and absence of perforation representing an incremental feed movement. From this it follows that with both rows at a certain scanning or sensing point of the tape being devoid of perforation due to a fault in the tape, the actuating levers of the planetary gears would operate one against the other. The problem arising from this condition involves the design of a safety or interlocking mechanism preventing combined operation of the levers, but allowing of operation if at a certain point only one of the rows is devoid of perforation, as will become further apparent from the description of the drawings.

In accordance with a further feature of the invention, the last-mentioned aim is achieved by the provision of a safety arrangement, whereby the scanning lever cooperating with the first of a pair of rows of perforations associated with a planetary gear set is linked with one of a pair of cooperating safety levers which, in its spring-loaded initial position, projects into the path of the control lever the movement of which is under the influence of the second scanning lever cooperating with the second row of perforations, and whereby the latter lever is linked with said first safety lever which, in its spring-loaded initial position, projects into the path of the control lever the movement of which is under the influence of the scanning lever cooperating with said first row of perforations. By the ensuing alternate interaction between the levers there is thus provided the possibility of an existing perforation at a certain point and within one row only of two cooperating rows of the tape acting to retract the safety lever out of the path of the control lever coordinated with the other row of tape perforations.

In the constructional realization of the last-mentioned inventive concept, it must be considered that the respective safety lever can be principally retracted out of the path of its coordinated control lever only when the oscillating scanning lever actuating the same has reached the outer tape surface, that is, such as to cause a relative movement between the scanning and safety levers at the beginning of each stroke of the scanning lever.

The latter aim is achieved, in accordance with a still further object of the invention, by the provision of each scanning lever with a pin projecting into an oblong recess or slot of an intermediate member associated with the coordinated safety lever.

Referring to requirement (2) relative to the precise control of the planetary gear sets, the following must be considered. It has already become known to provide special adjusting means operative during the stoppage of a planetary gear set, that is, with the existence of perforations at a certain point of both rows coordinated therewith, whereby the driving gear of the planetary set is locked during an operating stroke in the position resulting from the preceding operating stroke. It has furthermore become known to readjust the driving gears of the planetary sets upon completion of each working stroke to a predetermined position by means of a special adjusting arrangement in such a manner as to insure the mechanism to be set, prior to the commencement of a new working stroke, to an initial or starting position exactly corresponding with the program stored by the control tape, to thereby result in the avoidance of displacement of the mechanism after a number of operating strokes or cycles. Such an automatic or emergency adjustment could heretofore be used separately only rather than in combination or continuously in connection with the same feed mechanism and, as a consequence had the disadvantage of requiring an excessive transmitting path resulting in increased mounting space and other defects.

Accordingly, yet another object of the invention is the provision of automatic adjusting means operating continuously in connection with feed mechanism of the type forming the basis of the present invention, said adjusting means being both simple and compact in design, as well as effective and reliable in operation.

The last-mentioned aim is achieved, according to a further feature of the invention, by the provision of a self-adjusting arrangement for the planetary gear sets comprising essentially a bellcrank lever interposed between each pair of control levers of said set, said bellcrank lever having a tooth conforming to the driving gear teeth of said set, on the one hand, and said lever being provided with a stop, on the other hand, adapted to engage a suitable abutment of the associated scanning lever in dependence upon the position of the associated control lever.

Finally, according to a still further feature of the invention, continuous automatic re-adjustment of the planetary gear sets is achieved by the provision of a control disk or cam upon the shaft of the eccentrics serving to drive the planetary sets, said cam serving to operate a corresponding number of adjusting levers during the inoperative half-cycles of the control levers.

The invention, both as to its ancillary objects and novel aspects, will be better understood from the following detailed description of a preferred practical embodiment, taken in conjunction with the accompanying drawings forming part of this specification and in which:

FIG. 1 is a perspective view of a sewing machine equipped with automatic control mechanism constructed in accordance with the principles of the invention;

FIGS. 2a, 2b and 2c laid side-by-side collectively show, in part schematically, a complete coordinate control system of the invention, including the planetary drive units and coordinate distorting and reversing stages, the control tape being shown twice for ease of illustration;

FIG. 4 is a rear view of the coordinate feed and distorting mechanism shown with the side walls of the device removed;

FIG. 5 is a side view of the coordinate feed and distorting mechanism taken on line V—V of FIG. 4 and being shown in part fully and in part diagrammatically;

FIG. 6 is an elevation of a coupling gear pair, shown partly in section;

FIG. 7 is a perspective view of one of the reversing gear stages of FIG. 2;

Figure 8B:
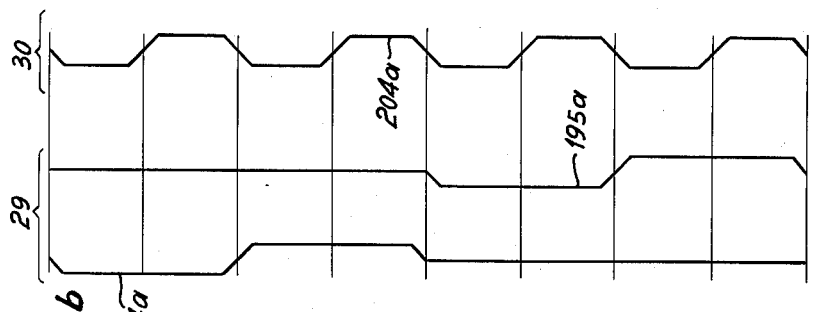
FIG. 8 shows, in developed representation, the control curve of the reversing gear stage for the $y$-coordinate, as well as the control curves for the size (length) distorting stage.
Figure 8A:
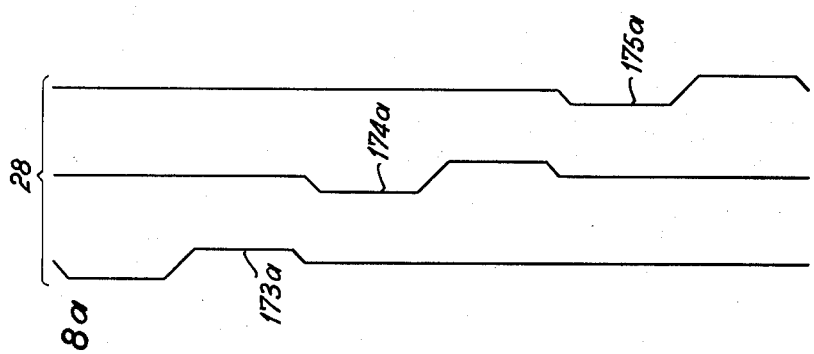
Figure 9:
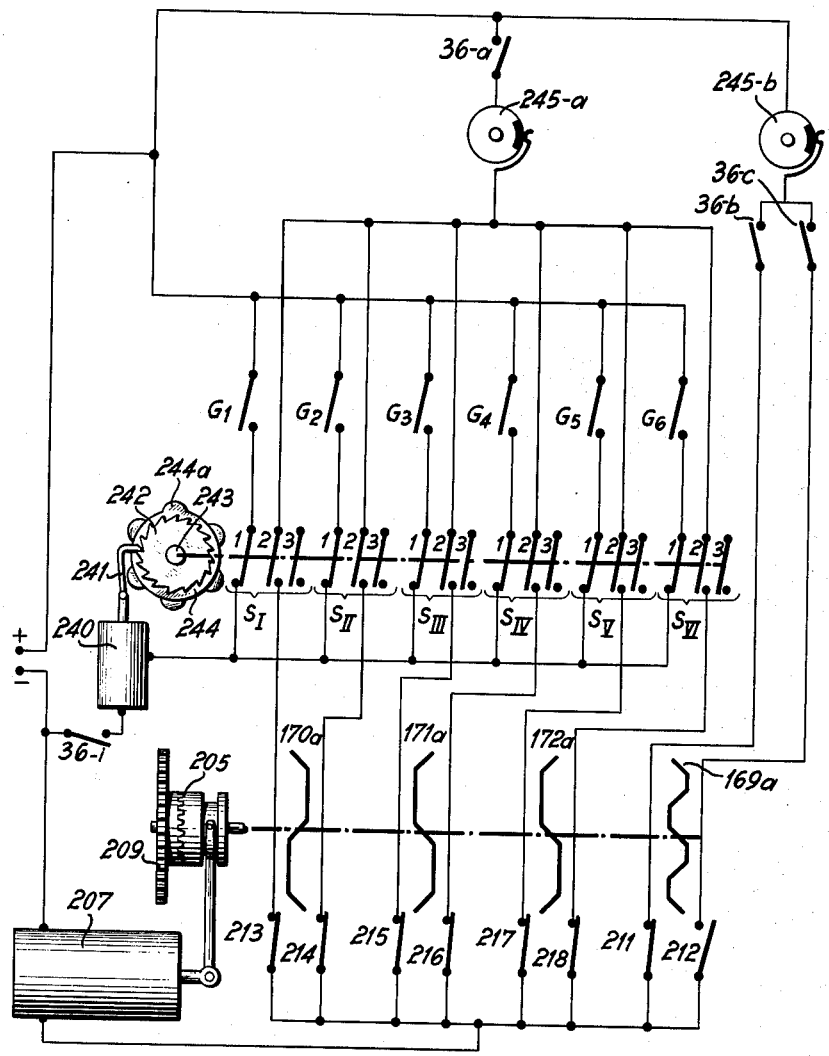
Figure 10:
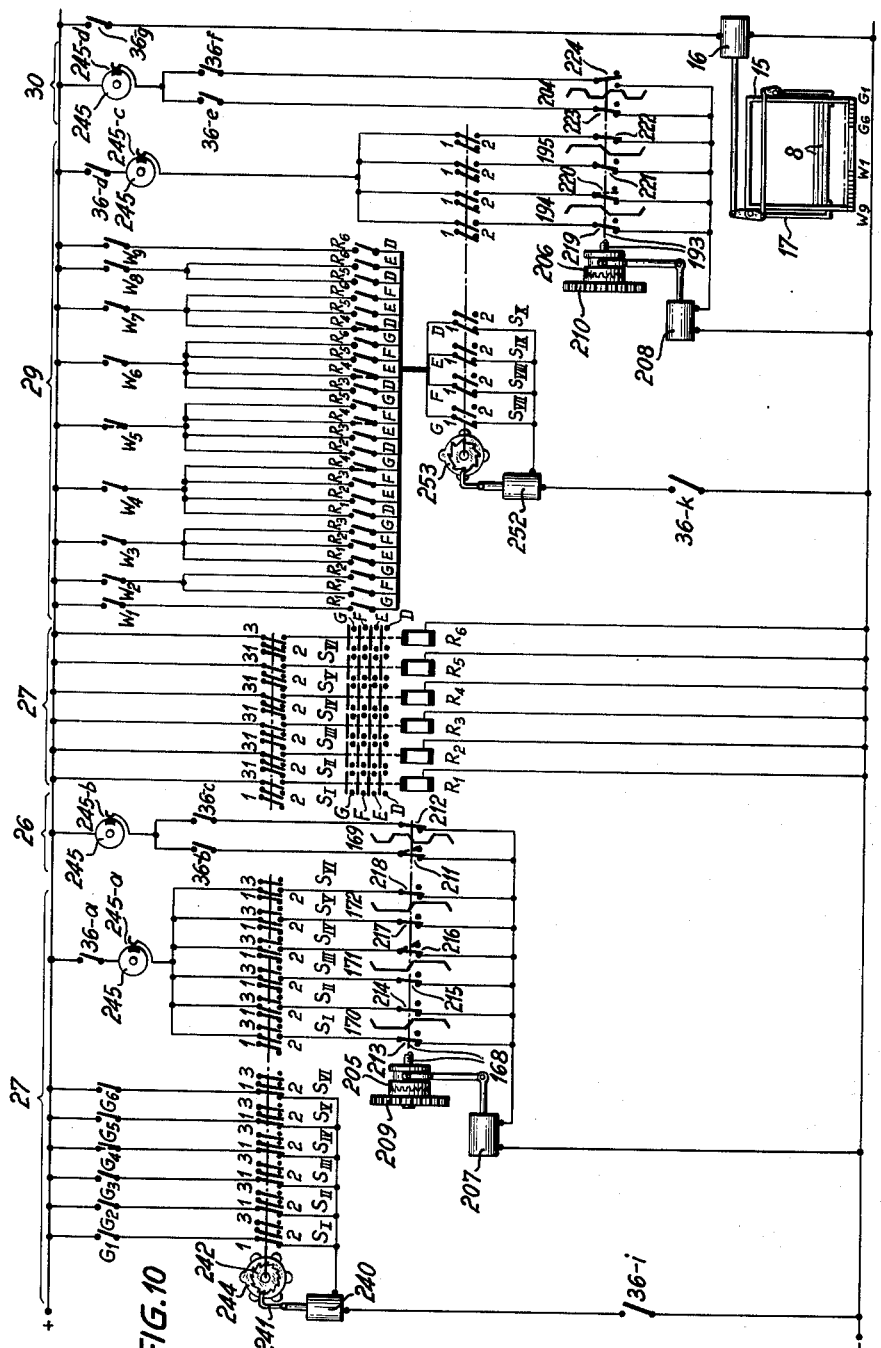
Figure 15:
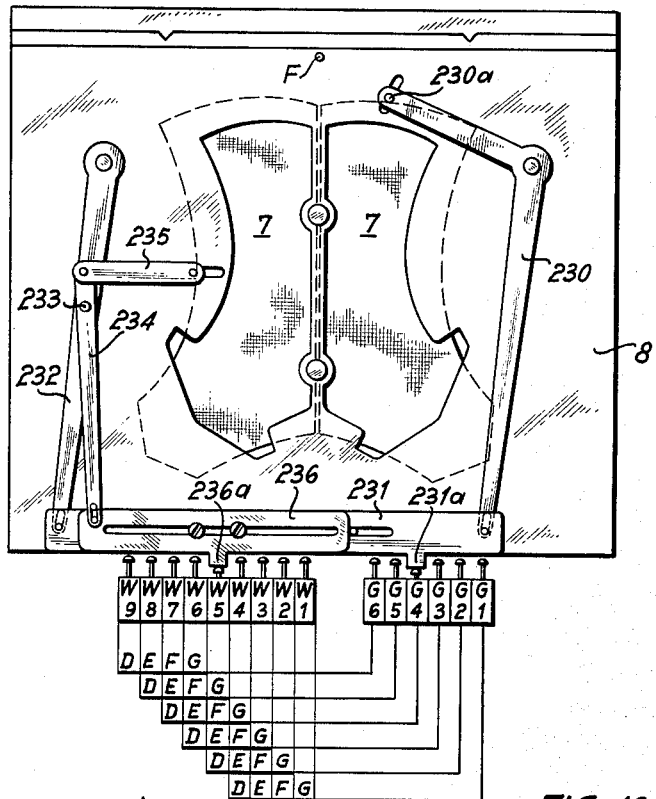
Figure 16:
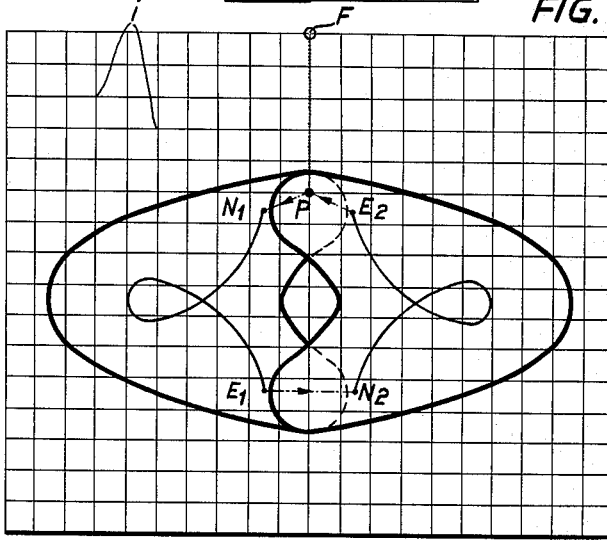
Figure 17:
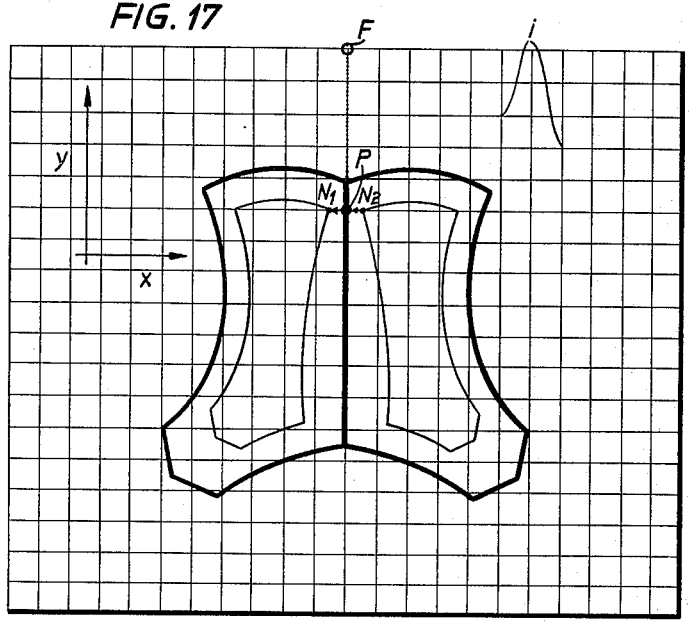
Figure 18:
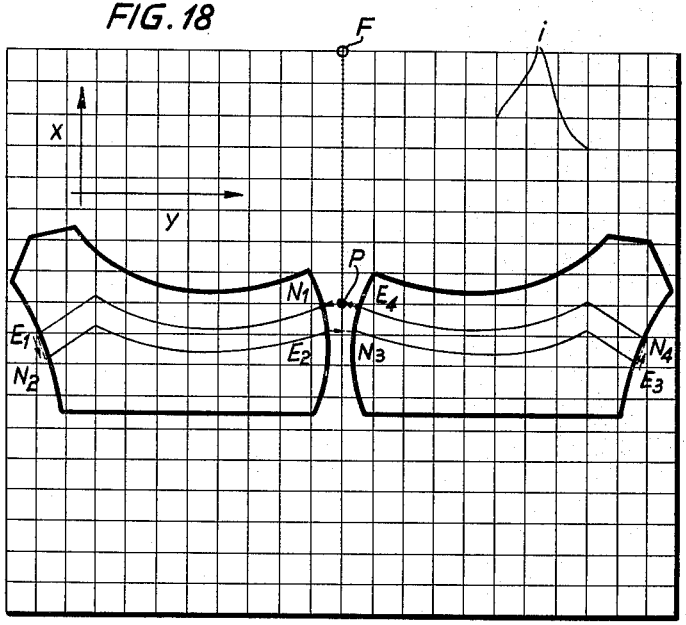

FIG. 8a similarly shows the control curves for the distortion stage of the basic width;

FIG. 8b similarly shows the control curves for the distortion stage of the actual width and for the reversing gear stage of the $x$-coordinate;

FIG. 9 is an electrical wiring diagram of the distorting stage for the $y$-coordinate or length displacement;

FIG. 10 is a complete electrical wiring diagram of the system according to the invention, including the reversing stages of the $x$ and $y$-coordinates, the distortion stages for both the length and width, as well as the pickup and feeding device of the sewing goods carrier;

FIG. 11 is a schematic view showing the auxiliary gear mechanism for the sewing of intermediate sizes;

FIG. 12 is an electrical wiring diagram of the auxiliary gear drive of the preceding figure;

FIG. 13 is a partial plan view of the sewing goods carrier and associated release switches;

FIG. 14 schematically illustrates the output drives for the $x$ and $y$-coordinates under normal operating conditions;

FIG. 14a illustrates the output drives for the $x$ and $y$-coordinates upon interchange of the coordinates;

FIG. 15 shows the sewing goods carrier and release switches and their relation for the size and width control, respectively;

FIG. 16 illustrates the effective range of the transport slide and the mounting of a pair of sewing parts each to be sewn along an open seam;

FIG. 17 illustrates the effective range of the transport slide and mounting of two sewing parts each to be sewn along a closed seam; and FIG. 18 illustrates, as an example for the coordinate interchange, the effective range of the transport slide and the mounting of two sewing parts each to be sewn along two open seams.

Like reference characters denote like parts and elements throughout the different views of the drawings.

Referring more particularly to FIG. 1 of the drawings, the numeral 1 denotes the upright of a conventional sewing machine being mounted upon a base (not shown) and having connected thereto an upper overhanging arm 2 which terminates in a preferably exchangeable sewing head 3. The arm 2 is provided with a slot 4 through which projects a rack 5 serving to drive or displace a transport slide 6 supporting a sewing goods carrier or frame 8 upon which have been mounted one or more sewing pieces 7 to be operated on.

Secured in a direction parallel to the arm 2 of the upright 1 is a fabric or sewing goods supporting arm 9 being adjoined on both sides by a table or platform 10. The latter rests upon a pair of supports 11 being displaceably mounted upon a pair of bars or rods 14 secured to the machine and adjustable by means of a handwheel 12 and threaded shaft or feed screw 13, or by any other suitable means.

Disposed at the opposite end of the table 10 is a storage rack or container 15 serving to hold a stack or number of sewing goods frames or carriers 8 supporting the sewing pieces 7 of different size to be individually and sequentially released by a separating and release mechanism 17 under the control of an electromagnet 16. Immediately adjoining the rack 15 and mounted upon the table 10 are two rows of electric release switches $G_1$–$G_6$ and $W_1$–$W_9$ comprising, in the example shown, six and nine switches, respectively, and being adapted to be actuated by tongues or projecting noses 231a and 236a, FIG. 13, secured to or forming part of each of the carriers 8 and positioned relative to each other in dependence upon the variation factors, that is size and width, of the sewing pieces 7 stacked in the rack 15. The table 10 is furthermore provided with a slot 20 extending in a direction transverse to the sewing machine and having disposed therein an endless conveyer chain 21 or the like for the feeding of the individual sewing goods carriers 8 from the rack 15 to the operative or stitching position upon the slide 6, in the manner as will become further apparent as the following description proceeds.

Projecting beyond an opening 22 in the top of the upright 1 is the feed roller 23 of a perforated control tape 24 having stored therein a finite operating program corresponding to the mean or basic size of the stitching pattern to be produced.

Figure 2A:
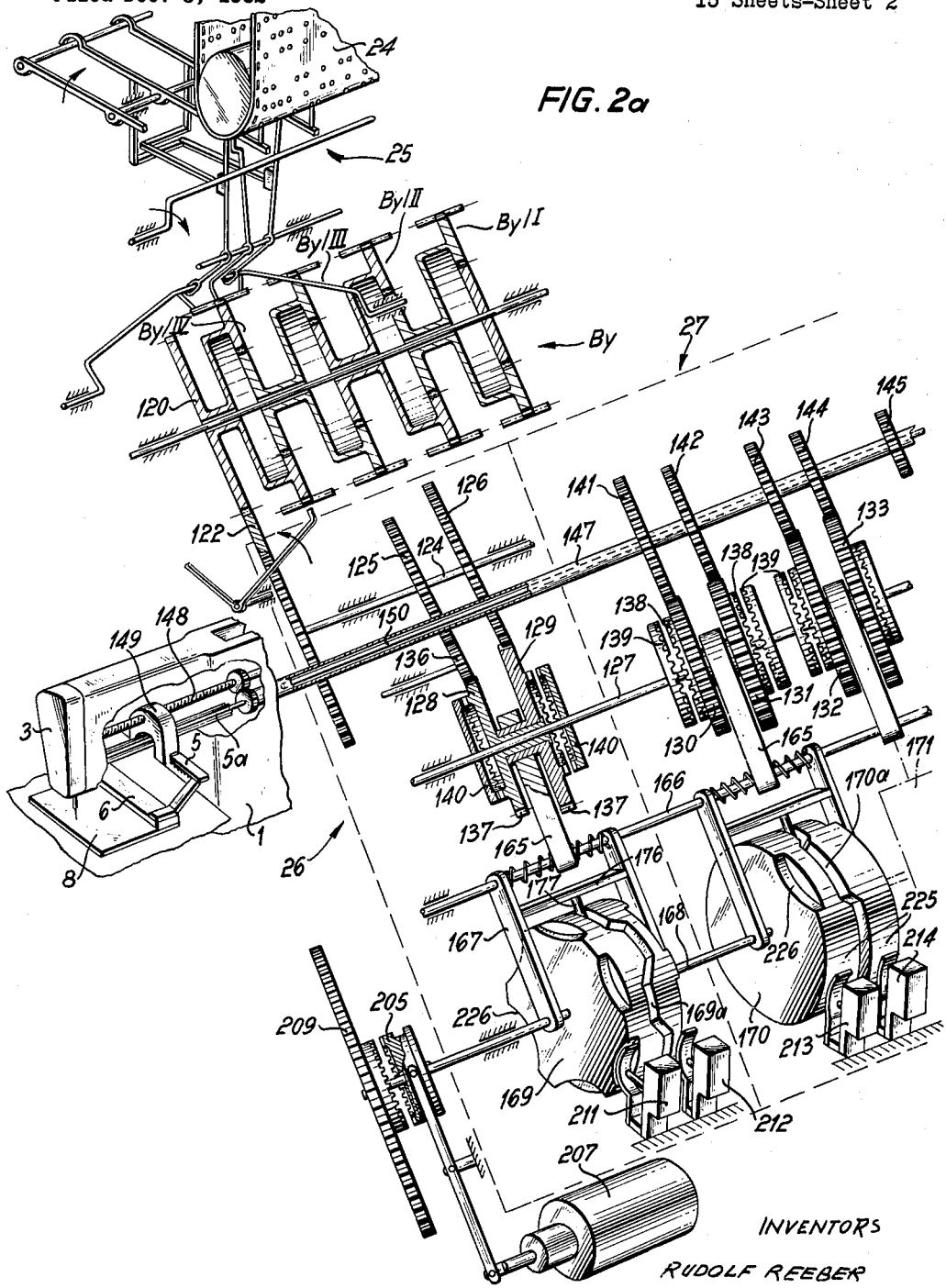
Figure 2B:
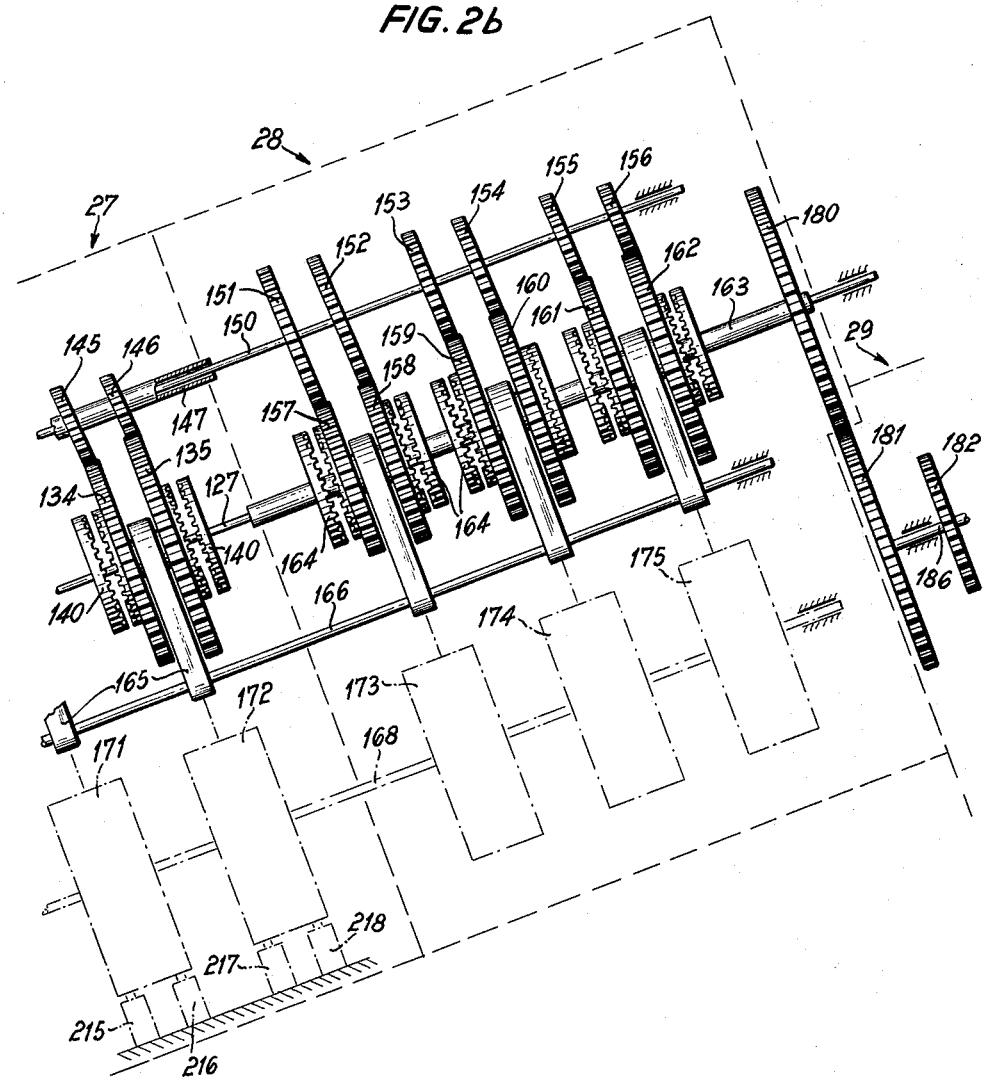
Figure 2C:
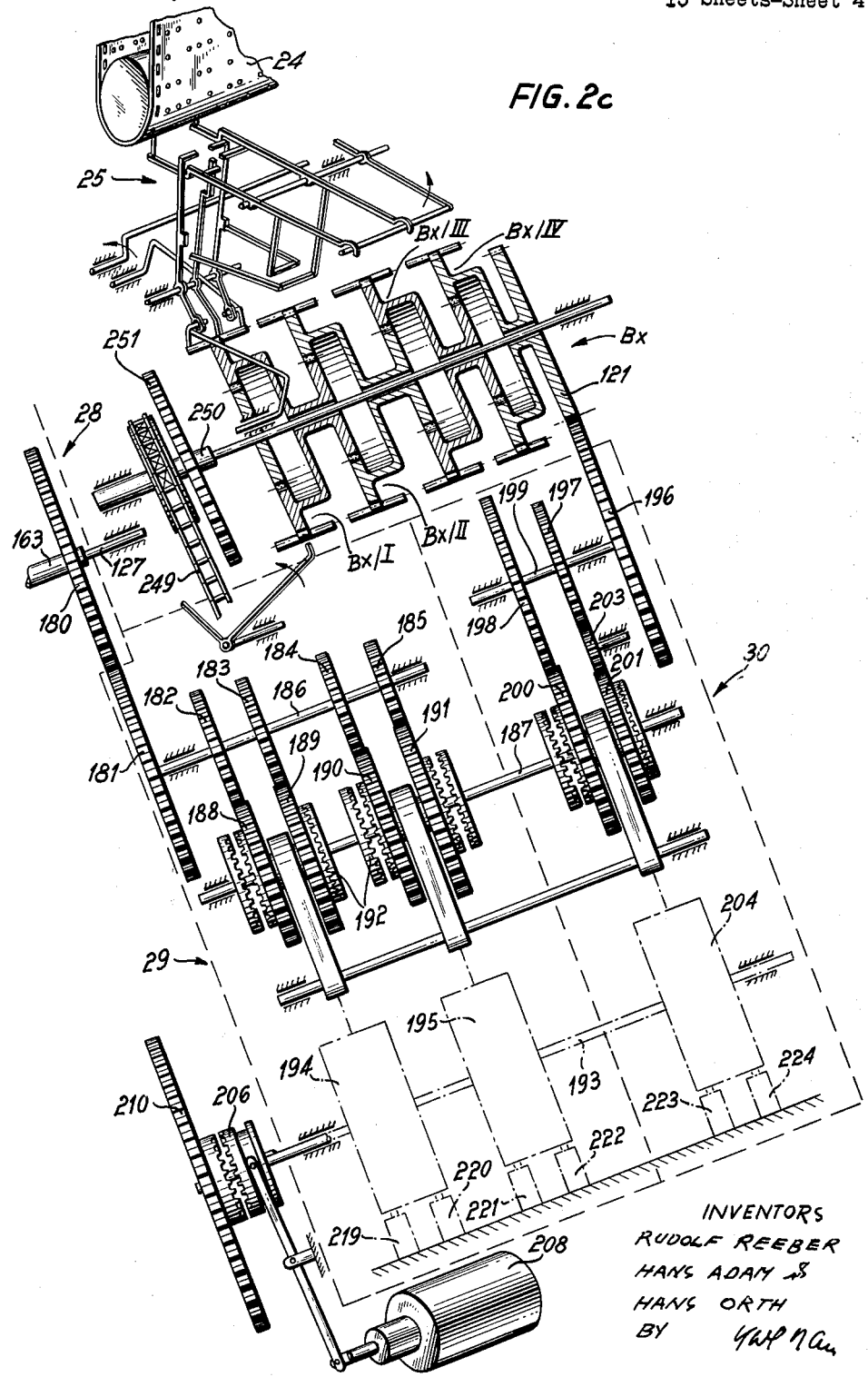

FIGS. 2a–2c show partly in diagrammatic form the complete assembly of the automatic drive and control mechanism according to the invention, comprising essentially a feed mechanism controlled by the perforated tape 24 and consisting of mechanism 25 for the scanning of the operating program stored by the tape and transmission to the component planetary gear drive units $B_x$ and $B_y$ for the $x$ and $y$-coordinates, and, coordinate distorting mechanism according to the invention being driven by said feed mechanism and including a reversing stage 26 for the $y$-coordinate, the distortion stages 27, 28 and 29 for the size or length, the basic width and the actual width, respectively, and the reversing stage 30 for the $x$-coordinate.

Figure 3:
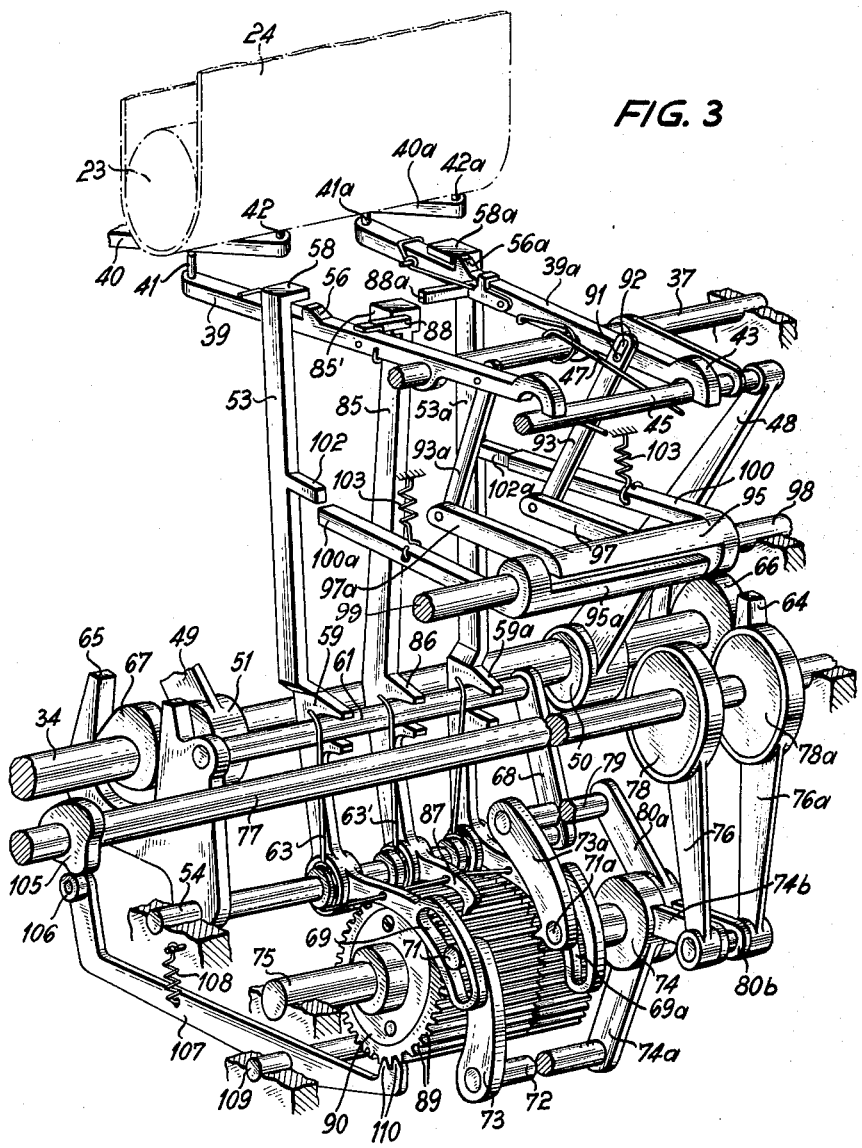
FIG. 3 is a perspective partial view of the tape sensing and planetary gear actuating mechanism.

The complete feed mechanism, FIGS. 3, 4, 5, may be constructed as an exchangeable unit or package being supported by a pair of symmetrically disposed supporting walls 32, FIGS. 4 and 5, separated by a pair of spacing rods 31. Journalled within said walls are the drive shaft 33 of the tape feed roller 23, as well as the main drive shaft 34 of the feed mechanism.

The drive shaft 33 of the feed roller may be operated in either the right or left direction by the main drive or arm shaft of the sewing machine through a conventional step-by-step drive mechanism (not shown). The control tape 24, in the example shown, is provided with seventeen rows of perforations, FIGS. 1 and 5, sixteen of which serve for the storage of the operating program or the mean stitching pattern, while the seventeenth row serves to control the rhythm or sequence of the operatings by controlling sequence drum or switch 36, FIG. 4, to be described in greater detail in the following. Each eight of the sixteen rows representing the stitching pattern serve to control the operation of the planetary gear units $B_x$ and $B_y$, respectively. Each unit $B_x$ and $B_y$ may consist of four planetary gear sets $B_x/I$–$IV$ and $B_y/I$–$IV$. FIGS. 2 and 5, with two rows of perforations being provided for each set for rotation in the right or left direction, respectively. Furthermore, the rows of perforations are so distributed upon the tape 24 as to cause each row coordinated with the unit of the x-coordinate to be followed by or adjoining a row coordinated with the y-coordinate, and vice versa. Rotatively disposed on each side of the tape 24 about shafts 37, 38, FIGS. 3 and 4, are a plurality of scanning or sensing levers 39, 39a . . . 40, 40a . . . equal in number to the number of rows of perforations, that is, eight levers on each side of the tape feed roller 23 in the example illustrated. The scanning levers 39, 40 . . . are in the form of double levers having their ends adjoining the tape fitted with sensing pins 41, 41 . . . 42, 42a . . . and having each of their arc-shaped opposite ends arranged to engage one of a pair of oscillating bars or rods 45, 46 coordinated with the $B_x$ and $B_y$ units, respectively, said levers being urged into resilient engagement with the respective bars by the action of springs or the like 47.

The afore-mentioned oscillating bars 45, 46 are actuated in unison by means of a pair of excentrics 50, 51, FIGS. 3 and 5, mounted upon the main drive shaft 34 and associated excentric rods 48, 49, respectively, said excentrics being arranged such as to cause all scanning levers 39, 40, or sensing pins 41, 42, to simultaneously engage the tape 24, during a working or scanning stroke whereby to, in turn, cause the sensing pins and associated scanning levers to assume a different position depending upon the presence or absence, respectively, of a perforation at the point of the tape being scanned, in the manner shown by FIG. 3.

The transmission of the data stored upon the tape 24 to the planetary sets is effected by means of a number of control levers 52, 53, 53a . . . each cooperating with one of the scanning levers 39, 39a . . . 40, 40 . . . and being constructed, in the example shown, in the form of bell-crank levers, said control levers being subdivided, in a manner corresponding to the scanning levers, into two groups or rows and being rotatively supported by a pair of stationary shafts or axes 54, 55, FIGS. 3 and 4.

The control levers 52, 53 are arranged to have one of their ends project into the oscillating path of the coordinated scanning levers 39, 40, the latter being fitted with stops or abutments 56, 56a . . . 57 adapted to become engaged by or disengaged from the cooperating stops 58, 58a . . . of the control levers 53, 53a . . . depending upon the position of the scanning levers 39, 40, that is, upon whether the respective sensing pins 41, 42 have or have not penetrated a perforation of the tape 24. The control levers 52, 53 are furthermore provided near their pivot axes with U-shaped extensions 59, 59a . . . 60 embracing and resiliently engaging bars or rods 61, 62 due to the action of springs 63. Each of the rods 61, 62 has an end connected to a fork-like extension 64, 65, respectively, each being mounted upon one of the shafts 54, 55 of the control levers 52, 53, and embracing a triangular excentric or cam 66, 67, respectively, the latter being in turn, mounted upon the main drive shaft 34 of the feed mechanism. The opposite ends of the rods 61, 62 are each connected with the shafts 54, 55 through an oscillating link 68.

The remaining ends of the control levers are fitted with oblong arcuate slots 69, 69a . . . 70, wherefrom it follows that there are coordinated with each planetary gear set $B_x/I$–$IV$ and $B_y/I$–$IV$ two control levers 52, 52a, 53, 53a having two slots 69, 69a and 70, 70, respectively. Projecting into one of the slots 69 of the planetary set $B_y/I$ shown in FIG. 3 is a pin 71 which is secured to the end of a feed lever 73 rotatable about a shaft 72. The latter is, in turn, secured to the end of an arm 74a of an angular lever 74 being rotatably mounted upon the shaft 75 of the planetary gear unit $B_y$. The remaining arm 74b of the lever 74 is linked to an excentric rod 76 being oscillated in an up and down movement by means of an excentric 78 mounted upon a rotary shaft 77 being parallel to the main drive shaft 34.

A similar arrangement is provided for cooperation with the slot 69a of the control lever 53a, FIG. 3, being engaged by a pin 71a secured to a second feed lever 73. The latter is rotatively mounted upon a shaft 79 secured to an angular lever 80a being actuated by way of an arm 80b and excentric rod 76a by an excentric 78a also mounted upon the shaft 77 in angularly displaced relation to the excentric 78. This mechanism is duplicated for the operation of the feed lever 81, FIG. 4, by the provision of an excentric 82 disposed on the opposite side of the tape (not shown) for the coordinate unit $B_x$ comprising the planetary gear sets $B_x/I$–$IV$.

Each of the drive shafts 77, 77' of the excentrics 78, 82 carries a gear 83, 83a meshing with a driving gear 84 upon the main drive shaft, as indicated schematically in FIG. 4.

Rotatably mounted about axes or shafts 54, 55 between each pair of control levers 52, 53 of the planetary units $B_x/I$–$IV$ and $B_y/I$–$IV$ is an angular adjusting lever 85, FIG. 3, being provided, in a manner similar to the control levers 52, 53 with a U-shaped extension 86 resiliently engaging the oscillating bar or rod 61, by the action of a spring 63'. The lever 85 has a T-shaped enlargement at its upper end arranged to cooperate with a pair of spring-urged extensions 88, 88a mounted upon the adjoining scanning levers 39, 40, in such a manner as to project, in the absence of a perforation of the rows associated with the respective scanning levers, into the path of the T-shaped end 85' and to allow the lever 85 to carry out a full oscillating movement, determined by the excentric 67, only if both rows are perforated at a particular scanning point of the tape. The end of the lower arm of the lever 85 carries a tooth 87 conforming in shape to the teeth 89 of the drive gear of the coordinated planetary gear set $B_y/I$, FIG. 3, and engaging said teeth if the lever 85 performs a complete oscillating movement, to thereby provide an emergency adjusting arrangement for the planetary gear sets.

Linked with each of the control levers 39, 39a through pins 91 is an arm 93, 93a having a slot 92, each said arms being, in turn, linked to one end of lever arms 97, 97a each secured to one half of a split sleeve 95, 95a, the halves of said sleeve comprising two groups corresponding to the arrangement of the scanning levers 39, 39a and being rotatably mounted upon a pair of stationary shafts 98, 99 respectively. Extending from the opposite non-split end portions of the sleeve halves 95, 95a and in directions parallel to the lever arms 97, 97a are a pair of arms 100, 100a. The sleeve halves 95, 95a are so positioned as to engage one another and to cause the arm 100 of the sleeve half 95 linked with the scanning lever 39a to project into the path of a stop 102a of the control lever 53a being actuated by lever 39a to which is, in turn, linked the other sleeve 95a.

The arms 100, 100a are normally urged by means of springs 103 to a predetermined initial position, that is, such as to be aligned with the stops 102, 102a of the control levers 53, 53a, respectively. This interlocking mechanism for the prevention of the effect of faulty perforation of the control tape is repeated for the remaining levers 40, 40a of the remaining half of the feed mechanism of a planetary gear set as indicated schematically in FIG. 4.

Mounted upon each of the shafts 77, 77' is a control cam 105, FIG. 3, being resiliently engaged through a roller 106 by one end of a double arm automatic adjusting lever 107 through the action of a coil spring 108. Lever 107 is rotatively mounted upon a stationary shaft 109 and carries at its free opposite end two teeth adapted to engage the outer teeth 89 of the planetary gear set. Further mounted upon the shaft 109 are additional adjusting levers for the remaining planetary sets $B_y/II$–$IV$ (not shown in FIG. 3) which operate in the same manner as the lever 107. The same adjusting arrangement is provided for the planetary gear sets of the unit $B_x$ for the x-coordinate, as will be readily understood.

The main drive shaft 34 of the feed mechanism is driven directly by the arm shaft 35 of the sewing machine via a coupling 35a, FIG. 5. The arm shaft 35 is, in turn, driven by way of a chain or the like 111, FIGS. 4, 5, from a shaft 112 being connected in a known manner (not shown) with an arrangement for stopping the sewing machine at a predetermined stitching position, such as with the needle in the "up" position, and provided with a pulley 113 driven by a suitable driving motor (not shown) through a driving belt or the like 114.

As pointed out hereinbefore the four planetary gear sets $B_x/I-IV$ and $B_y/I-IV$ of the planetary drive units $B_x$ and $B_y$ act as adding devices or mechanical computers, preferably according to the ternary adding mode, with each actuating impulse of the outputs of the plantary unit $B_y$ being applied to the input driving gear 120 and with each actuating impulse of the unit $B_x$ being applied to the input driving gear 121, respectively.

As can be seen more clearly from FIGS. 2–5, the output rotation of the coordinate gear units $B_y$ is applied from the gear 120 by way of a countergear 122 to a shaft 124 journalled within the supporting walls of the device and carrying a pair of input gears 125, 126 of a reversing gear unit 26 further comprising a countershaft 127 parallel to the shaft 124, shaft 127 in turn carrying a multiplicity of juxtaposed pairs of coupling gears 128–135 of conventional construction. The first pair of coupling gears 128, 129 meshes with the gears 125, 126 with the two greater gears 126 and 129 having a transmission ratio 1:1 and being in direct meshing engagement with one another, while an intermediate gear 136 also with a 1:1 ratio is interposed between the smaller input gear 125 and the coupling gear 128, to provide a reversible gear train of conventional construction.

The coupling gears 128–135, FIG. 2, are combined in pairs and arranged each to rotate freely and to be axially displaceable upon the shaft 127. As more clearly seen from FIGS. 6 and 7, each pair of coupling gears is fitted, aside from its circumferential spur gear teeth 137, with lateral gearings 138 adapted to engage the further lateral gear teeth of one of the coupling halves 139, 140 mounted at a close spacing distance from each coupling pair 128–135 upon the shaft 127.

The three further pairs of coupling gears 130–135, FIG. 2, provided in addition to the first coupling gear pair 128, 129, are in direct meshing engagement with a corresponding number of countergears 141–146 fixedly mounted upon a hollow shaft 147, the latter serving to drive the feed screw 148 which cooperates with an internally threaded bracket 149 connected with the slide 6 supporting the sewing goods carrier 8, to drive the latter in the lengthwise or y-direction. Concentrically mounted within the shaft 147 is a further shaft 150 which serves to drive a longitudinally toothed shaft 5a cooperating with the rack 5, to drive the slide 6 in the transverse or x-direction, according to the example illustrated in the drawing. The shaft 150 carries six spur gears 151–156 acting as countergears of the six further coupling gears 157–162 which in a manner similar as described are combined in pairs and mounted upon a hollow shaft 163 coaxial with the shaft 127. Further mounted upon the shaft 163 in a manner similar as described and immediately adjacent to each of the coupling gears 157–162 are the coupling halves 164.

Projecting into the space between each pair of coupling gear pairs 128–135 and 157–162 is a shifting member 165, FIGS. 6 and 7, displaceably mounted upon a supporting shaft or rod 166 being parallel to the shaft 127. Each of said shifting members 165 is embraced by an H-shaped member 167 mounted, on the one hand, upon the rod 166 and being loosely supported by a further shaft 168, on the other hand, and embracing one of a number of control disks 169–175 each provided with a curved control groove 169a–175a, respectively, as more clearly shown in FIGS. 8, 8a and 8b. The cross-piece 176 of the H-member 167 carrier a follower pin 177 having its free end extending into and camming with an associated groove 169a–175a of the control disks 169–175.

The construction of the coupling gears and of the shifting members is more clearly shown in FIGS. 6 and 7, relating to the reversing gear stage for the y-coordinate. As shown by FIG. 6, the coupling gear 128 is fitted with an extension sleeve 128a upon which is mounted the coupling gear 129 provided with a similar extension 129a and secured against axial displacement by means of a spring ring 178. As a consequence, both gears 128 and 129 may be rotated separately, but may be displaced axially, either towards the left or the right, in unison only by the shifting member 165 and in accordance with the configuration of the control groove 169a for coupling, through one of the coupling halves 139, 140, respectively, with the shaft 127.

Mounted upon the hollow shaft 163 carrying the coupling gears 157–162 for varying the basic width is a countergear 180 being driven at a 1:1 ratio by a gear 181 which is, in turn, mounted upon an input shaft 186 carrying four gears 182–185, the latter cooperating with coupling gears 188–191 mounted in pairs upon a shaft 187 and having coupling halves 192.

The coupling gears 188–191 for varying the actual width are controlled in the same manner as described hereinbefore in reference to the remaining coupling gears by means of control disks 194, 195 shown schematically only and mounted upon a shaft 193, said disks being provided with control grooves 194a and 195a, respectively, FIG. 8b.

The afore-mentioned output drive gear 121 for the x-coordinate meshes with a countergear 196 mounted upon the input shaft 199 of the further reversing gear stage 30 having a pair of input gears 197 and 198. The latter cooperate, in the same manner as the gears 125, 126, with two coupling gears 200, 201 mounted upon shaft 187, whereby again the smaller coupling gear 201 meshes with the smaller input gear by way of an intermediate gear 203. The coupling gears 200 and 201 are controlled by means of a control disk 204 mounted upon the shaft 193 and having a control groove 204a, FIG. 8b.

As more clearly seen from FIGS. 4 and 5, the drive for the x-coordinate is applied from the shaft 150 through a gear 115 and countergear 116 to the toothed shaft 5 by way of a coupling 116a. The drive for the y-coordinate is supplied from the hollow shaft 147 through gear 117 and countergear 118 being carried by a shaft 119 which, in turn, carries a gear 270. The latter meshes with the countergear 271 mounted upon shaft 272 and driving the feed screw 148 by way of the coupling 272a.

Figure 8:
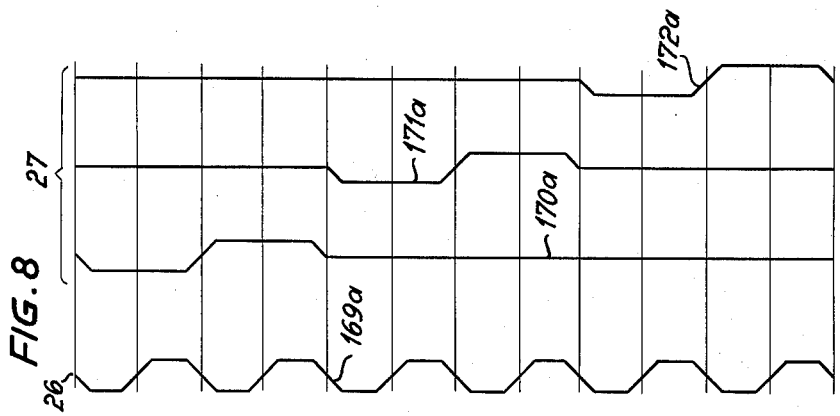

With reference to the configuration of the control grooves 169a–175a, 194a, 195a and 204a, FIGS. 8–8b, of the control disks 169–175, 194, 195 and 204 of the stages 26, 27, 28, 29 and 30, the following must be considered. As more clearly shown in FIGS. 2a–2c, there are provided, according to the example illustrated by the drawings, six selectable gear ratios or stages for the variation of the maximum excursion or distortion of the length (y-coordinate) and four selectable gear ratios for the variation of the maximum excursion or distortion of the width (x-coordinate). As will be understood, the number of distortion stages or gear ratios is purely arbitrary, the example shown and described being especially adapted, although not limited thereto, to the automatic sewing of shoe parts.

Referring to the control stage 27 for varying the length, each coupling gear path involves two operating positons and each of the control grooves 170a–172a associated with the three coupling gear pairs must be designed accordingly. From this it follows that the three control disks 170–172 of the stage 27 mounted upon shaft 168 must be angularly displaced by 120° from each other such that with each 60° partial rotation of one of the coupling gears 130–135 is selected and coupled with the shaft 127. At the same time, it is necessary that the selected coupling gear may be rotated in either left or right direction in accordance with an additional command or control impulse, from which it in turn follows that the groove 169a of the reversing stage 26 should have twelve operating positions, that is, six for rotation in the left direction and six for rotation in the right direction, or that two operating positons of groove 169a coincide with a single operating position of each of the grooves 170a–172a.

As pointed out hereinbefore, the length of the work pieces constitutes an invariable magnitude, while the basic width is a function of the length and the acutal width is, in turn, a function of the basic width. As a consequence, there is coordinated with each length or size a predetermined basic width, from which it follows that the operating positions for the six size variations conrtolled by the control disk packet 170–172 are substantially identical, both as regards the configuration of the control grooves and as regards the displacement of the disks with the operating positions for the six basic widths being controlled by the disk packet 173–175.

In accordance with the four distortion stages of the actual width (section 29) as provided for in accordance with the example illustrated, the respective control disks 194, 195 must be relatively displaced by 180° instead of by 120° and, analogously, the control groove of the control disk 204 of the reversing stage of the x-coordinate must include only eight instead of twelve operating positions.

Each of the control disk shafts 168 and 193 carries at its end a coupling member 205 and 206 adapted to be coupled with a continuously rotating driving gear 209 and 210 by means of an electromagnet or solenoid 207 and 208, respectively, as shown in FIGS. 2 and 7.

As more clearly shown in FIGS. 4 and 5, the main drive shaft 112 carries a pinion 227 meshing with two gears 228 and 229 which serve to drive a pair of shafts 237, 238 carrying gears 239 and 202, respectively, with the gear 239, in turn, driving the coupling gear 210 and the gear 202 driving the coupling gear 209.

Coordinated with the control disk 169 of the reversing gear stage 26 for the y-coordinate, with each control disk 170, 171, 172 of the length control stage 27, with each control disk 194, 195 of the width control stage 29, as well as with the control disk 204 of the reversing stage 30 for the x-coordinate, are a pair of keying switches 211–224, respectively, each of which engages the left or right projecting edge portions of the associated control groove 169a, 170a. . . . The disks 169–204 are formed with peripheral recesses 226 at the places corresponding with each of the control positions of the grooves 169a, 170a. Each keying switch is electrically connected, on the one hand, with the associated electromagnet 207, 208 serving to couple the shafts 168, 193 carrying the associated control disks, and to a control circuit to be further described in the following in reference to FIGS. 9 and 10, on the other hand.

As previously pointed out, the release switches $G_1$–$G_6$ and $W_1$–$W_9$ serve for the purpose of application to the control circuit of the variation factors corresponding to the length or size and width, respectively, of the sewing pieces to be operated on.

For the latter purpose and as shown more clearly by FIGS. 13 and 15, the sewing goods carrier or supporting frame, being of the type as shown by U.S. Patent No. 3,156,203, assigned to the same assignee as the instant application, is fitted with a linkage assembly 230, 231, 232, the first adjustable linkage member 230 of which has an extension serving as a scanning or probing element 230a and the central member 231 having a projecting nose or tongue 231a serving for the determination of the size of the sewing pieces and actuation of a proper release switch in accordance with the position thereof varying in accordance with the size of the pieces, in the manner further explained in the following. Mounted upon the other linkage member 232 about a pivot 233 is a double-arm lever to which is linked a scanning element 235, on the one hand, and an adjusting slide 236 mounted upon member 231 and provided with a projecting nose 236a, on the other hand. Arm 235 serves for the probing of the width of the sewing pieces 7 with the nose 236a assuming a position corresponding to said width, whereby to afford an automatic control of the release switches $G_1$–$G_6$ and $W_1$–$W_9$ in dependence upon the size of the sewing pieces to be operated on, as will become further apparent as the description proceeds.

From the foregoing it follows that the nose 231a moves from right to left with increasing size of the work pieces whereby the mechanism probing the width also moves from right to left by the same amount or, in other words, displacement of the nose 231a from right to left, to effect adjustment for a given size, causes the width adjusting lever 235 and with it the nose 236a to move also from right to left to the same extent. From this it follows that the number of release switches for selecting the width must be increased beyond the actual number of the effectively adjustable widths in order to enable the nose 236a, at a given position of the nose 231a, to encompass the total range of the switches $W_1$–$W_9$ for the effectively possible widths. In other words, in case of six sizes, six release switches $G_1$–$G_6$ are required and, in order to operate all the six switches, the nose 231a has to move through five divisions or intervals from the right to the left. As a consequence, the nose 236a for adjusting the width inherently also moves through five divisions from right to left whereby with four available widths according to the example illustrated, a total number of nine release switches $W_1$–$W_9$ for adjusting the width are required corresponding to 5 plus 3=8 operating divisions or intervals.

Referring to FIG. 9, there is shown an electrical wiring diagram explanatory of the principle of transmission of a group of variation factors up to the point of selection of a certain coordinate distortion ratio. In the example shown, there has been chosen for this purpose the length (y-coordinate) being identical with the size of the work pieces in accordance with the foregoing. More specifically, the six normally open-circuited release switches $G_1$–$G_6$ are connected to the plus pole of a suitable power source, on the one hand, and to each one of the normally closed switch contacts 1 of a series of multiple selector switches $S_I$–$S_{VI}$, all of said contacts being, in turn, connected to one terminal of an electromagnet 240 the opposite terminal of which is connected, by way of an interrupting contact 36–i controlled by the sequence switch or drum 36 previously mentioned to the minus pole of said source. With the circuit being closed, the magnet sequentially operates a pawl 241 cooperating with a ratchet 242 which is mounted upon a shaft 243 carrying six cam disks 244, the latter having cams or projections 244a angularly displaced by 60° from each other and each serving to operate one of the switches $S_I$–$S_{VI}$, whereby to provide a selector step switch mechanism operating in a manner as to cause each of the switches $S_I$–$S_{VI}$ during a full revolution of the ratchet and with it each of the contacts to be opened or operated sequentially and intermittently in a manner readily understood. The multiple switches in combination with the step-by-step operated disk packet 170–172 act as temporary storage devices of the adjusting values or factors, in the manner further explained in and understood from the following. The contacts 2 of the switches $S_I$–$S_{VI}$ are normally open and connected each to one of the keying switches 213–218 coordinated with the control disks 170–172 of the distortion stage 27.

Preceding the switching contacts 2 of the multiple switches $S_I$–$S_{VI}$ is an interrupter contact 245a connected to the plus pole and serving as a synchronizing means.

Contact 245a is actuated by a drum switch 245, FIGS. 4 and 5, which is mounted upon a shaft 246 being driven by shaft 112 through a chain 247. Immediately preceding the interrupting contact 245a is a sequence switch contact 36–a operated by the sequence switch dmum 36, FIG. 4, previously mentioned. Drum 36, FIG. 4, is driven by way of a chain 249, FIG. 2, which is, in turn, driven by a hollow shaft 250, mounted upon the output shaft of the feed unit $B_x$. Shaft 250 carries a gear 251 having outer teeth conforming to the planetary gear driving teeth 89, FIG. 3. Gear 251 is driven by the seventeenth row of perforations of the control tape, in a manner equal to and by means similar to the scanning and driving means of the units $B_x$ and $B_y$.

For the operation of the control disk 169 of the reversing stage, a special circuit is required, since this constitutes a so-called "yes-no" control being independent of the variations of size of the sewing pieces, that is, the reversing gears must be controlled by the sequence switch 36 only. To this end, each of the keying switches 211, 212 of the control disk 169 is preceded by a sequence switch contact 36–b, 36–c being in turn, preceded by a synchronizing switch contact 245–b in parallel to the synchronizing contact 245a.

FIG. 10 shows the complete wiring diagram for automatically effecting both the size and width control by means of the apparatus according to the invention. The diagram, in analogy to FIG. 2, is subdivided into sections 26–30, corresponding to the equal-numbered stages of FIG. 2.

By designating the four widths with D, E, F, G, there is obtained a picture, as shown in FIG. 15, of the progression from left to right in dependence upon the progression of the length from right to left. This dependence translated into practice results in the arrangement of the switches $W_1$–$W_9$ as shown within the section 29 of the wiring diagram, FIG. 10. Section 28 shows the connection of the contacts 3 of the multiple switches $S_I$–$S_{VI}$ the contacts 1 of which are electrically connected to the release switches $G_1$–$G_6$ of section 27 and the contacts 2 of which are connected to the keying switches 213–218, for the control of the length or size of the pattern being sewn. Connected to each contact 3 is one of a set of relays denoted by $R_1$–$R_6$ in the drawing, each said relays, in turn, constituting a multiple switch having four contacts corresponding to the widths D, E, F, G, respectively.

Following the width control switches $W_1$–$W_9$ that is, after their subdivision into 6×4=24 connecting switches with the relays $R_1$–$R_6$, there is provided, in a manner similar as in section 27, a storage arrangement for the width values consisting of four multpile switches $S_{VII}$–$S_X$ each having two contacts 1 and 2 arranged for actuation in the manner of section 27 by a multiple selector switch packet comprising four control cams 253 and a coupling magnet 252 which may be connected and disconnected by an interrupting contact 36–k of the sequence switch 36. Connected in parallel to the section 29 there is provided a further sequence switch contact 36–d in series with the contacts 2 of the multiple switches $S_{VII}$–$S_X$ and the keying switches 219–222 which are, in turned connected with the coupling magnet 208, in substantially the same manner as in the section 27.

Besides, in the section 30 the interrupting contact 245–d preceding the keying switches 223, 224 of the control disk 204 of the reversing stage for the x-coordinate, is followed in the same manner as in section 26 by a pair of sequence switch contacts 36–e and 36–f. Finally there is provided a sequence switch contact 36–g connected in series with the electromagnet 16 which serves to release the sewing goods carriers 8 from the stack 15, the magnet 16 being energized only after the commencement of the sewing of the second part of a work piece in the case of a two-part sewing pattern.

FIG. 11 illustrates schematically an auxiliary drive mechanism for adjusting the intermediate sizes $G_{1\ 1/2}$–$G_{6\ 1/2}$, comprising a magnet 275 which serves to actuate a double-arm T-shaped angular lever 276 having a pair of cross-arms 276a and 276b arranged to cooperate with a pair of coupling members 277, 278, respectively. Coupling member 277 is displaceably mounted upon a hollow shaft 279 by means of a key 279a, said shaft being driven by the output shaft of the gear unit $B_x$ and being coaxial with the latter. In the same manner, the coupling member 278 is displaceably mounted upon a hollow shaft 280 by means of a key 280a, said shaft being driven by the unit $B_y$ in the manner indicated. Under normal conditions, that is, during the stitching of the whole sizes $G_1$–$G_6$, the lever 276, due to the action of a tension spring 281, is urged to a position in which the arm 276a couples the member 277 with the gear 120, resulting in the latter being coupled with the hollow shaft 279, and in which the arm 276b couples the gear 121 with the hollow shaft 280. If the device is set for an intermediate size by energization of the magnet 275, the latter operates the lever 276 to a position in which the gears 282 and 283 are coupled with the shaft 279 and 280 and in which the input shafts 124, 199 are driven by way of the gear pair 282/284 or 283/285 instead of by way of the gear pairs 120/122 or 121/196, respectively.

The wiring diagram shown in FIG. 12 further illustrates the cooperation of the magnet 275 with the main electric circuit for adjusting the machine for the sewing of a desired intermediate or half size by means of an auxiliary release switch G½, FIG. 13, as described in further detail in the following:

Spaced from the last main release switch $G_6$, FIG. 12, there is disposed the auxiliary release switch G½ having associated therewith an auxiliary selector switch $S_{XI}$ in a manner similar to the multiple switches $S_I$–$S_{VI}$ associated with the main release switches $G_1$–$G_6$. Switch $S_{XI}$ has only two contacts 1 and 2 of which the first is connected, on the one hand, to the release switch G½ and, on the other hand, to a magnet 240 (not shown in FIG. 12,) and of which the second contact is connected on the one hand, to an interrupter 245–a and to a relay $R_7$ having two switching positions and contacts a–b and c–d, respectively, on the other hand.

Further connected in parallel to the sequence switch 36–a is a further sequence contact 36–h designed in such a manner as to remain closed during the entire sewing cycle and to be opened only during the stoppage of the machine. Connected in parallel to the contact 36–h and relay R7 is the magnet 275.

Referring to FIG. 14, there is shown schematically mechanism for exchanging the x and y-coordinates. To this end, the output drive of the x-coordinate is applied, by way of a gear pair 115/116, from the shaft 150 to a shaft 288 upon which is mounted a gear 289 meshing with a gear 291 mounted upon a shaft 290. The latter, in turn, carries a gear 292 which meshes with a countergear 293 being fixedly connected to a coupling member 116a which is rotatively mounted in the housing of the machine. The output drive of the y-coordinate is applied from the hollow shaft 147 and by way of the gear pair 117/118 to a hollow shaft 294 being coaxial with the shaft 288, shaft 294 carrying a gear 295 which meshes with a gear 296 being loosely mounted upon the shaft 290. Gear 296 meshes with a gear 297 mounted upon a shaft 298 which carries a coupling member 272a.

FIG. 14a shows the arrangement of FIG. 14 with the coordinates having been interchanged. In place of the loosely mounted gear 296 of FIG. 14, a gear 300 is mounted upon the shaft 290, while in place of the fixedly mounted gear 291 a gear 301 is loosely mounted upon the shaft 290 in the FIG. 14a arrangement. Finally, the driving gear 297 of the drive shaft 298 for the x-coordinate is omitted and replaced by a gear 302 serving as output driving gear of the x-coordinate.

The operation of the automatic sewing mechanism according to the invention will now be described in detail in reference to the drawings.

During the sewing of the second part of a sewing piece 7 mounted upon the carrier 6, preparation is made for the next following piece to be fed to the sewing position. The sequence switch during this operation is rotated to a position, whereby to cause a closing of the contact 36–g, FIG. 10, thereby to energize the magnet 16 and to operate the separating device 17. As a consequence, the lowermost sewing goods carrier 8 drops upon the table 10, whereby to cause the tongues 236a and 231a, FIG. 15, to actuate one of the switches $W_1$–$W_9$ and $G_1$–$G_6$, depending upon the position of said tongues, or in turn upon the size and width of the work piece 7 to be operated on.

In the following it is assumed, by way of example and as shown in FIG. 15, that the work piece to be operated on has a size $G_4$ and a width F. In such a case, as may be seen from FIG. 15, the switch $G_4$ for the size and switch $W_5$ for the width must be closed. Closing of the width control switch $G_4$ results in the energization of the magnet 240 by way of contact 1 of the multiple switch $S_{IV}$, FIGS. 9 and 10, whereupon the pawl 241 is started to operate in a periodic up and down movement to step-by-step rotate the ratchet 242 and with it all the cam disks 244. As a consequence, the multiple switches $S_I$–$S_{IV}$ are actuated sequentially and intermittently by the cams 244a until the circuit of the magnet 24θ is interrupted at $S_{IV}(1)$ which latter condition will continue as soon as the multiple switch $S_{IV}$ is operated by its coordinated cam 244. At this instant, rotation of the cam shaft 243 is arrested, whereby the contact $S_{IV}(1)$ is opened and the contacts $S_{IV}(2)$ and $S_{IV}(3)$ are closed.

Closing of the switch $W_5$ controlling the width has resulted in the following operation. As seen from FIG. 15, $W_5$ may comprise all the possible widths D, E, F, G, depending upon which of the switches $G_1$–$G_6$ controlling the size has been previously operated. In the case of the switch $G_4$ selected according to the example mentioned, only the width F will be adjusted by the switch $W_5$. As further seen from FIG. 10, actuation of the release switch $G_4$ has resulted not only in the operation of the switch $S_{IV}$, but furthermore in the response of the relay $R_4$, the latter having four contacts $R_4/D$–$G$, that is, the contacts $R_4/D$, $R_4/E$, $R_4/F$ and $R_4/G$ of the section 28 have been closed.

As a result of the closing of the release switch $W_5$, current is caused to flow through contact $R_4/F$ of the relay $R_4$ and from there through a conductor connecting all the F-contacts to the contact 1 of the multiple switch $S_{VIII}$, whereby to energize the magnet 252. The latter initiates the operation of the associated selector switch shaft in a manner similar to magnet 240, whereby to actuate the switch $S_{VIII}$ in a manner similar to the switch $S_{IV}$. In this manner, the values of both the size $G_4$ and width F are set and stored temporarily by the selector switches.

In order to prevent obliteration of the values set by the switches $G_1$–$G_6$ and $W_1$–$W_9$ and stored by the switches $S_I$–$S_X$ during the feeding of the sewing goods carrier 8 to the slide 6, the sequence switch 36, after a certain operating interval of the machine, during which the values of size and width are selected and stored, actuates an interrupting contact 36–i inserted in the circuit of the magnet 240 as well as interrupting contact 36–k inserted in the circuit of the magnet 252. In this manner, the storage of the values of the size and width will no longer be effected by a subsequent operation of the switches $G_1$–$G_6$ and $W_1$–$W_9$.

In the meantime, the sewing operation of a first sewing piece has been completed. Simultaneously with the last impulse from the tape 24 to return the carrier to the starting point P, FIG. 17, the sequence switch 36 receives an impulse from its coordinated row of tape perforations, to advance the same by a single step. As a consequence, the switch 36 releases the drive of the chain 21 which has an actuator 21a removing a first sewing goods carrier 8 from the slide 6 and feeding the same along the table 10, while a second carrier 8 is fed from its temporary position below the stack to the slide 6 and secured to the latter automatically by the provision of suitable connecting means (not shown).

Before describing the ensuing sewing operation or cycle, it is necessary to take into consideration the following further conditions and operating requirements.

FIG. 16 shows an area being subdivided into a plurality of squares and representing the effective operating area of the slide 6. During the assembly of the machine, the slide is adjusted in accordance with a reference point F coinciding with the symmetry line of the area and representing the initial or starting point of a sewing program or operating cycle. Besides the operation of the coordinate distortion units is such, by a proper design of the mechanism, that a feed movement is effected at the intersection points i only of the area. From this it follows that for each new program (change of tape or operating sequence), it is necessary to move from the reference point F to the next intersection point P being closest to the starting point of the seam to be sewn. Upon arriving at the latter, adjustment is made for the sewing goods, whereupon the slide is moved over the shortest distance and with the needle operation being suspended to the seam starting point. In order to reduce the idle periods of the machine, that is, the time during which the needle operation is interrupted, there results the further requirement, in case of two parts being sewn upon a work piece supported by the same carrier, to arrange the starting points as close as possible to one another. This aim may be achieved by mounting the parts in overlapping relation, provided the seams do not overlap, FIG. 16. For a given program, there results therefore the following paths of the slide 6:

P–$N_1$ (needle operation interrupted); $N_1$–$E_1$ (needle operating)

$E_1$–$N_2$ (needle operation interrupted); $N_2$–$E_2$ (needle operating)

$E_2$–P (needle operation interrupted).

From the foregoing it follows that for each new sewing goods carrier, after completion of the sewing pattern of the second part, it is necessary to return to the starting point, whereas the path F–P has to be traversed only once for the same sewing program or pattern. During the time when the second sewing goods carrier 8 is fed by the chain 21 to the slide 6, the sequence switch 36 controls the circuit of the coordinate distortion mechanism by closing the contacts 36–a and 36–d, FIG. 10, and connecting the synchronizing contacts 245–a and 245–c to the current source, said contacts being so designed for the safety of the sewing machine as to be closed only when the upper thread take-up lever of the machine (not shown) is in its upper dead center position. In accordance with the foregoing, there are set up, therefore, a pair of current flows as follows: plus pole of the source-selector switch contact $S_{IV}(2)$-closed keying switch contact 216-magnet 207, on the one hand, and plus pole-selector switch contact $S_{VIII}(2)$-keying switch contact 22θ-magnet 208, on the other hand. Both magnets 207 and 208 are thus energized, effecting thereby the coupling of the curved disk shaft 168 with the continuously rotating gear 209 and of the curved disk shaft 193 with the continuously rotating gear 210, respectively.

During rotation of the shaft 168, the pins 177 engage the grooves 170a–172a and 173a–175a, whereby to cause each pin to move to the left and to the right and back to the center position and to sequentially intermittently operate the gears 130–135 into coupling with the shaft 127, and to sequentially and intermittently couple each of the gears 157–162 with the shaft 163 by way of the H-members 167. At the same time, each of the coupling gears 188–191 is similarly sequentially and intermittently coupled with the shaft 187 during a revolution of the shaft 193.

More specifically, the operation of the length distortion stage 27 during a revolution of the shaft 168 is as follows:

The pin 177 moves within the groove 170a of the control disk 170 at first to the left, whereby to displace the H-member 167 also towards to the left and resulting in the coupling of the gear 130 with its associated lefthand coupling half 139 mounted upon the shaft 127. Subsequently, the pin 177 in accordance with the shape of the control groove moves towards the right, whereby the H-member 167 shifts the gear 131 to the right and into meshing connection with the righthand coupling half 139, while disconnecting gear 130 from the lefthand coupling half 139. Subsequently, the pin returns to the left to a central position within the control groove 170a, FIG. 8, that is, without effecting any further shifting of the gears 130 and 131 which are thus coupled sequentially and intermittently with their associated coupling halves 139. Due to the relative angular displacement of the control curves 170a–172a, the next following curve 171a now sequentially couples the gears 132 and 133 followed by the similar operation of the gears 134, 135 by the third curve 172a. The shaft 168 rotates as long as the coupling magnet 207 is energized, in which case the electric circuit is closed by way of the associated keying switches 213–218. As soon, however, as the recess 226 of the disk 171 is engaged by the keying switch 216, the latter is opened, as indicated in dotted lines in FIG. 10, to thereby disconnect the magnet 207 and to effect a decoupling of the shaft 168 from the gear 209, while the coupling gear 133 remains in engagement with the associated coupling half 139 of shaft 127.

At the same time, the control of the basic width in the stage 28 has been effected in substantially the same manner and depending upon the control of the length by coupling of the gear 160 with the associated coupling half 164 of the hollow shaft 163.

The same operation has taken place in the width distorting stage or section 29. In the latter, the coupling between the control disk supporting shaft 193 and the continuously rotating gear 210 has been released at the instant when the recess 226 of the disk 194 is engaged by the keying switch 22θ to result in the interruption of the circuit of the magnet 208. As a consequence, the coupling gear 189 remains in meshing engagement with the shaft 187.

After the desired distortion gear shift has been effected in the manner afore-described it is necessary to adjust the sense of rotation of the shafts 127 and 163 to result in the desired coordinate directions which are independent of the size and width of the sewing pieces and accordingly are not under the control of the sewing goods carrier as are the former factors. For each operating cycle determined by a single run of the tape 24, that is, one and the same program, the coordinate directions may be determined in advance and stored by the sequence switch 36. For this purpose, the switch 36 operates either the contact 36–b, FIG. 10, for the right direction or the contact 36–c for the left direction in case of the y-coordinate, and similarly the switch 36 operates either the contact 37–f for the right direction and contact 36–e for the left direction in the case of the x-coordinate, respectively, whereby to briefly re-energize either the magnet 207 by way of the keying switch 211 or 212, or to briefly re-energize the magnet 208 by way of the keying switch 223 or 224, respectively.

Let it be assumed, by way of example, that the x-displacement of a preceding sewing pattern was directed to the right and the y-displacement was directed to the left, and that it is now desired to retain the previous x-direction but to change y from left to right also. There results in this case for the y-coordinate a current path as follows: from the plus pole across interrupting contact 245–b and sequence switch contact 36–b to the keying switch 211 having been closed by the preceding switching operation, and finally to the magnet 207. The latter is thus energized to rotate the shaft 168 through an angle of 30°, since in the position as shown in FIGS. 2 and 8 the keying switch 211 is opened by its recess 226, as shown in dotted line in FIG. 10. During the 30° rotation nothing has been changed in the position of the coordinate distorting mechanisms, inasmuch as the latter, as pointed out, are operated every 60° only, as appears from FIG. 8, that is, since one switching position of the distortion stage 27 coincides with two switching positions of the reversing stage 26. Furthermore, the resulting current path in the unit for the x-coordinate is as follows: from the plus pole across contact 245–d, the closed sequence switch contact 36–f to the keying switch 224. The latter has been opened during the preceding operation, whereby to interrupt the circuit of the magnet 208 and to arrest the shaft 193 in the adjusted position.

Re-starting of the sewing is controlled by the sequence switch 36, the corresponding control circuit of which advantageously including a final switch in addition to the safety switches coordinated with the distorting stages 27, 28, 29 and the reversing stages 26 and 30, being actuated upon completion of the adjustment of said stages, in such a manner as to enable the circuit for re-starting of the machine to be closed only after actuation of the final safety switch or mounting of the sewing goods carrier 8 upon the slide 6 and actuation of the remaining safety switches upon completion of the adjustment of both the distortion and reversing stages. As a consequence, the sprocket of the chain 111 will be coupled with the shaft 112, resulting in the driving of the arm shaft 35. The latter drives, on the one hand, a known step-by-step mechanism (not shown) mounted within the arm 2 of the machine which, in turn, serves to sequentially operate the drive shaft 33 of the tape feed roller 33, and on the other hand, rotates the main drive shaft 34 by way of the coupling 35a.

The main driving shaft 34, FIG. 3, operates the rods 45, 46 by way of the eccentrics 50, 51, in the manner described whereby to simultaneously advance all of the scanning pins 41, 41a . . . 42, 42a . . . towards the tape 24. In the example shown in FIG. 3, the pin 41 of the scanning lever 39 has been arrested by the tape in the absence of a perforation at the corresponding scanning point, whereas the pin 41a of the cooperating scanning lever 39a has penetrated a perforation of the tape. As a consequence, the rod 61 being driven at the proper rhythm by the triangular excentric 67 by way of the fork 65, will be enabled to impart its full operating stroke to the control lever 53, whereas the control lever 53a is arrested midway within its operating path by the stop 56a engaging the abutment 58a.

At the same time, the shaft 77 carrying the excentrics 78, 78a is driven through the gear pair 84/83, said excentrics actuating the feed pawls or levers 73, 73a. In the example shown, only the pawl 73 is enabled to engage the outer gear teeth 89 of the planetary gear 90 to thereby advance the same by one step, inasmuch as only the pawl or lever 73 is deflected, in the direction towards the gear teeth 89 of the planetary gear 90 through the full operating stroke of the control lever 53 by means of the pin 71 moving within the slot 69. During the second half of rotation of the main drive shaft, the feed levers 73, 73a, the control levers 53, 53a, and the scanning levers 39, 39a, return to their starting positions and, at the same time, all the automatic adjusting levers 107 controlled by the cam disk 105 are displaced towards their respective planetary gear $B_x/I$–$IV$ or $B_y/I$–$IV$, whereby to cause the teeth 110 of said levers to engage the outer teeth 89 of the planetary driving gears at the instant of the feed pawls being disengaged from the teeth 89. In this manner, undesired relative displacement of the planetary gear sets, other than those stored upon the tape 24, or simultaneous actuation of the gears 90 in opposite directions by the pawls 73, 73a, is substantially avoided.

If now, in the case of the planetary gear set $B_x/I$ referred to and during a scanning step or half-cycle, that is, during a first half revolution of the main drive shaft, no feed movement is to be produced, the two rows of tape perforation coordinated with said set must be perforated according to the basic design rule mentioned, that is, no perforation producing a feed movement and a perforation producing no feed. As a consequence, both stops 56, 56a will arrest the control levers 53, 53a on their way to the gear set $B_x/I$ by the abutments 58, 58a, whereby to release the common adjusting lever 85 by the projections 88, 88a carried by said levers, in such a manner as to allow the lever 85, in the "raised" position of projections 88, 88a, to carry out a full operating stroke and to enable the tooth 87 to engage the outer gear teeth 89, to thereby lock and readjust the planetary gear set.

The incremental rotary feed movement of the planetary gear sets $B_x/I$–$IV$ and $B_y/I$–$IV$ are added in a known manner, whereby to apply the sum or combined rotation to the input gear 120 for $y$-displacement and to the input gear 121 for the $y$-displacement, respectively. The drive of the $x$-displacement is applied to the gear 122 which applies the received impulse to the reversing stage 26, either by way of gears 125–136–128 or 126–129, and from there to the shaft 127 carrying the coupling gears 128–135. From the latter, rotation is transmitted, by way of the gear 133 selected in the manner described to the hollow shaft 147 at a predetermined transmission ratio determined by the design of the gears 133 and 144. Shaft 147, in turn, imparts the received impulse by way of the gear pairs 117/118 and 270/271, FIG. 5 and coupling 272a to the feed screw 148.

The displacement in the $x$-coordinate is transmitted from gear 121 to gear 196 and from there to shaft 187 carrying the coupling gears 188–201 for the width control. The coupling gear 189 selected in the manner described transmits the received impulse to its associated countergear 183 to rotate the shaft 186 which, in turn, transmits its rotation by way of gear pair 181/180 to the hollow shaft 163 carrying the coupling gears 157–162 for the control of the basic width. The rotation of the shaft 163 is, in turn, transmitted, by way of the coupling gear 160 selected according to the example mentioned, to the shaft 150 carrying the countergear 154. From the latter, the impulse is transmitted, by way of the gear pair 115/116 and coupling 116a to the toothed shaft 5a which serves to displace the slide 6 in the transverse or $x$-direction.

The electric switching operations for the storage and transmission of the half sizes are as follows.

As shown in FIG. 13, the linkage member 231 serving to adjust the whole sizes $G_1$–$G_6$ by the probing lever 231a is fitted with six auxiliary adjusting tongues 231b one of which actuates an auxiliary release switch G½ upon lowering of a sewing goods carrier 8 carrying a half-size work piece upon the table 10, whereas two of the auxiliary tongues 231a will pass freely on the opposite sides of the switch G½ without affecting the latter in the case of a full-size work piece to be operated on.

If the switch G½, FIG. 12, is closed, the selected value will be stored in the same manner as described in connection with the full sizes, by way of the magnet 240 (not shown in FIG. 12) and through a further cam disk (not shown) actuating an additional multiple switch $S_{XI}$. After the sewing goods carrier supporting an intermediate-size work piece has arrived in the operative position, that is, after connection with the slide 6, the sequence contact 36–a, interrupting contact 245–a, and contact 2 of the switch $S_{XI}$ will be closed in the ordinary manner. As a consequence, relap $R_7$ is energized, whereby to close the contacts $a$–$b$ and $c$–$d$ as long as the contact 245–a remains in closed position. Besides, the sequence contact 36–h being normally closed, as pointed out, has only a single open position corresponding to the stoppage of the machine. After the remaining switch operations of the distortion and reversing gear stages have been completed in the meantime, the sewing machine is started, resulting in the closing of the sequence contact 36–h. A current passing through the previously closed contacts $a$–$b$ operates the relay $R_7$ to its closed position.

As a consequence, contact $a$–$b$ forms a holding contact, whereby after the briefly closed contact 245–a, which may be operated only in the position of the upper thread-take lever of the sewing machine being in the upper dead center position, has been opened. As a result, the second contact $c$–$d$ of the relay $R_7$ will also remain closed, whereby to energize magnet 275 for the duration of a sewing cycle, that is, during the closing of the sequence switch contact 36–h. From the construction of the latter it follows that the first scanning step at the beginning of a sewing operation must not be transmitted to the sewing pattern, inasmuch as the intermediate size is set immediately after rather than simultaneously with the starting of the machine.

FIG. 17 shows two sewing parts each having a closed sewing pattern. In such a case, it is readily possible to provide a favorable starting point if both parts are mounted in such a position as to cause the desired variation of the width of the sewing piece to coincide with the control of the $x$-coordinate.

In contrast, FIG. 18 illustrates an example wherein the sewing pattern of each part consists of two open seams. In order, in such a case, to minimize the idle paths of the sewing goods carrier during the stoppage of the needle, the parts may be mounted in the manner shown, that is, with the open parts of the pattern being opposed to one another as two mirror images. In the latter case, the program starting point P should coincide with an intersection $i$ between the starting point $N_1$ and end $E_4$ of the seams.

The desired width distortion will now extend in the direction of the symmetry line F–P. In such a case, it is necessary to exchange the coordinate drives in the manner described, such that the width distortion no longer will be transverse but rather parallel to the line F–P.

As further seen from FIG. 18, the sewing operation, in the last-mentioned example extends from P to $N_1$ while the needle operation is interrupted, from $N_1$ to $E_1$ with the needle being in operation, from $E_1$ to $N_2$ with the needle operation being again interrupted, and from there to $E_2$ with the needle being in operation, whereupon the tape reaches its end position beyond the symmetry line F–P. For the sewing of the second part, the feed direction of the tape is reversed, whereby the aforedescribed operations will be repeated along the path $$N_3-E_3-N_4-E_4-P$$

In the foregoing, the invention has been described with reference to a specific illustrative device or system. It will be evident, however, that variations and modifications, as well as the substitution of equivalent parts and devices for those shown herein for illustration, may be made in accordance with the broader scope and spirit of the invention as set forth in the appended claims. The specification and drawings are accordingly to be regarded in an illustrative rather than in a restrictive sense.

We claim:

1. The combination with automatic sewing apparatus comprising a reciprocating needle, a sewing goods carrier having a pair of drive means to displace the same in coordinate directions for the sewing of a desired sewing pattern by said needle, a perforated control tape representing incremental coordinate displacements of said carrier corresponding to a sewing pattern of predetermined configuration, and a pair of gear adding devices including scanning and actuating means operably connecting said tape with each said drive means, to add the incremental displacements and to automatically sew a pattern of said predetermined configuration upon the sewing goods supported by said carried; of adjustable variable-ratio transmission means interposed between at least one of said devices and the associate drive means of said carrier, to vary the maximum coordinate excursion of said carrier by adjusting said transmission means for the sewing by means of a single control tape, of patterns of different pre-selectable size and conforming to the predetermined configuration of the pattern stored by said tape.

2. The combination with automatic sewing apparatus comprising a reciprocating needle, a sewing goods carrier having a pair of drive means to displace the same in coordinate directions of the sewing of a desired sewing pattern by said needle, a perforated control tape representing incremental coordinate displacements of said carrier corresponding to a sewing pattern of predetermined configuration, and a pair of gear adding devices including scanning and actuating means operably connecting said tape with each said drive means, to add the incremental displacements and to automatically sew a pattern of said predetermined configuration upon the sewing goods supported by said carrier; of variable-ratio motion-transmission means comprising a plurality of gear-shift sets in parallel relation and interposed between each said devices and the associated drive means of said carrier, and means to selectively control said gear-shift sets, to vary the maximum coordinate excursions of said carrier for the sewing, by means of a single control tape, of patterns of different preselectable size and conforming to the predetermined configuration of the pattern stored by said tape.

3. In automatic sewing apparatus as claimed in claim 2, including uni-control means to simultaneously adjust predetermined pairs of coordinate maximum excursions of said carrier by the said gear-shift sets of both said transmission means for the sewing of differently-sized work pieces of said predetermined configuration and varying in both cordinate dimensions.

4. In automatic sewing apparatus as claimed in claim 2, including uni-control means to simultaneously adjust predetermined pairs of coordinate maximum excursions of said carrier by the gear-shift sets of both said transmission means for the sewing of differently-sized work pieces of said predetermined configuration and varying in both coordinate dimensions, and auxiliary adjustable variable gear-shift means preceding one of said first-mentioned transmission means, to additionally vary one of the coordinate dimensions of said pattern for a fixed value of the other coordinate dimension.

5. In automatic sewing apparatus as claimed in claim 2, including adjustable direction-reversing means interposed between each said devices and the associated transmission means, to reverse either or both of the coordinate feeding directions of said carrier.

6. In automatic sewing apparatus as claimed in claim 2, including step-switch means to temporarily store the size of a work piece preparatory to its feeding to sewing position, and means to control said transmission means in dependence upon said storage means, to adjust said gear-shift sets in accordance with the size stored prior to the commencement of a pattern sewing cycle.

7. In automatic sewing apparatus as claimed in claim 2, each said transmission means having a pair of input and output shafts one of which is a hollow shaft, said shafts arranged with the one shaft of one transmission means being coaxial with a shaft of the other transmission means and with the remaining shaft of the first transmission means being coaxial with the remaining shaft of the second transmission mean.

8. The combination with automatic sewing apparatus of the type comprising a reciprocating needle, a sewing goods carrier having a pair of drive means to displace the same in coordinate directions for the sewing of a desired sewing pattern by said needle, and perforated control tape representing incremental coordinate displacements of said carrier corresponding to a sewing pattern of predetermined configuration, and a pair of gear adding devices including scanning and actuating means operably, connecting said tape with each said drive means, to add the incremental displacements and to automatically sew the pattern of said predetermined configuration upon the sewing goods supported by said carrier; of gear-shift means comprising a plurality of variable-ratio gear-shift sets in parallel relation and interposed between such of said devices and the associated drive means of said carrier controlled thereby, said gear-shift sets being equal in number to the number of sizes of work pieces to be operated on, a plurality of selector switches corresponding in number to the number of gear-shift sets, means to sequentially operate said switches in response to a work piece being advanced to operating position preparatory to a sewing operation, to temporarily store the size of said work piece by actuation of the coordinated selector switch, and means to sequentially operate said gear-shift sets by common operating means and under the control of said selector switches, to disable said operating means by the previously actuated selector switch, thereby to permanently adjust the respective transmission ratio in accordance with the size stored and to sew a pattern of said predetermined configuration and maximum coordinate excursion conforming with said size.

9. In automatic sewing apparatus as claimed in claim 2, including operating sequence switch means controlled by auxiliary perforations of said tape, and selectively adjustable direction-reversing means controlled by said sequence switch means and interposed between each said gear adding devices and said transmission means, to reverse either or both of the coordinate displacement directions of said carrier, for the sewing of mirror image patterns of like configuration defined by the perforations of said tape.

10. In automatic sewing apparatus as claimed in claim 2, including means mounted upon said carrier and adjustable according to the size of a work piece supported thereby, and index means to selectively adjust said gear-shift sets in response to the position of said index means, to vary the maximum coordinate excursion of said carrier for the sewing of a pattern conforming to said predetermined configuration and having a size conforming to the size of the work pieces being operated on.

11. The combination with automatic sewing apparatus of the type comprising a reciprocating needle, a sewing goods carrier having a pair of drive means to displace the same in coordinate directions for the sewing of a desired sewing pattern by said needle, a perforated control tape representing incremental coordinate displacements of said carrier corresponding to a sewing pattern of predetermined configuration, and a pair of gear adding devices including scanning and actuating means operably connecting said tape with each said drive means, to add the incremental displacements and to automatically sew the pattern of said predetermined configuration upon the sewing goods supported by said carrier; of variable-gear-shift means comprising a plurality of variable-ratio-gear-shift sets in parallel relation and interposed between each said devices and the associated drive means of said carrier controlled thereby, control means to sequentially intermittently operate said gear-shift sets until arrested by a control current in response to the sizes of the work pieces, having coordinated therewith different gear-shift sets, whereby to permanently adjust the respective gear-shift set, to produce a sewing pattern of said predetermined configuration and varying maximum coordinate excursion conforming with the size of a work piece being operated on.

12. In automatic sewing apparatus as claimed in claim 11, said control means comprising a plurality of release switches equal in number to the sizes of the work pieces to be operated on, an equal number of multiple-contact selector switches each having a normally closed contact in series with one of said release switches, to provide a plurality of parallel circuits each including a release switch and one of the first contacts of said selector switches, a step-operating mechanism having an actuating magnet in series with said parallel circuits, to sequentially operate said selector switches upon closing of one of said release switches coordinated with a corresponding size of a work piece to be operated on, whereby to arrest said mechanism upon operation of the respective selector switch and opening of the contact thereof, thereby to temporarily store the size of said work piece preparatory to a sewing operation, each of said selector switches having a further contact connected in the circuit of said control current and being normally opened and closed upon the operation of the associated selector switch.

13. In automatic sewing apparatus as claimed in claim 1, electrical control means including an array of stationary switching devices, means to selectively control the transmission ratio of said transmission means by said devices, and actuating means for said devices displaceably mounted upon said carrier for relative adjustment in accordance with the size of a work piece supported by said carrier, whereby to automatically selectively actuate said devices and to adjust a corresponding transmission ratio of said transmission means upon positioning said carrier in predetermined cooperative relation to said devices.

14. In automatic sewing apparatus as claimed in claim 13, including adjustable linkage means having at least one workpiece contour sensing element and mounted upon said carrier, to adjust said actuating means by positioning said element to engage said contour.

References Cited by the Examiner

UNITED STATES PATENTS

| | | | |
|---|---|---|---|
| 2,427,493 | 9/47 | Bullard. | |
| 2,534,572 | 12/50 | Burdett | 14—144 |
| 2,647,411 | 8/53 | Felocamo | 74—365 |
| 2,649,065 | 8/53 | Casper | 112—84 |
| 2,837,046 | 6/58 | Carson et al. | 112—118 |
| 2,875,390 | 2/59 | Tripp | 74—365 X |
| 2,876,650 | 3/59 | Sangster. | |
| 2,933,931 | 4/60 | Lisinkski | 74—144 |
| 3,029,758 | 4/62 | Hurme et al. | 112—102 |
| 3,083,580 | 4/63 | Carson et al. | 74—113 |

JORDAN FRANKLIN, *Primary Examiner.*